United States Patent
Shimada et al.

(10) Patent No.: US 6,891,297 B2
(45) Date of Patent: May 10, 2005

(54) ELECTRICAL-STEEL-SHEET FORMED BODY FOR ROTOR CORE, ROTOR, ROTARY ELECTRIC MACHINE AND RELATED METHOD

(75) Inventors: Munekatsu Shimada, Hachiouji (JP); Hideaki Ono, Yokohama (JP); Tetsurou Tayu, Yokosuka (JP); Makoto Kano, Yokohama (JP); Yu Owada, Yokosuka (JP); Naoshi Sakata, Tokyo (JP); Mitsuo Uchiyama, Yokosuka (JP); Toshimitsu Matsuoka, Yokosuka (JP); Kimihiro Shibata, Yokosuka (JP); Shinichiro Kitada, Tokyo (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 0 days.

(21) Appl. No.: 10/420,777

(22) Filed: Apr. 23, 2003

(65) Prior Publication Data

US 2003/0201685 A1 Oct. 30, 2003

(30) Foreign Application Priority Data

Apr. 25, 2002 (JP) .................................. P 2002-124320
Dec. 2, 2002 (JP) .................................. P 2002-349943

(51) Int. Cl.$^7$ ............................................. H02K 21/12
(52) U.S. Cl. ................ 310/156.01; 310/42; 310/154.11; 310/156.23; 310/154.03
(58) Field of Search ....................... 310/156.45, 156.56, 310/216, 156.01, 156.38, 156.41, 156.43, 156.44, 156.53, 42, 152

(56) References Cited

U.S. PATENT DOCUMENTS

| | | | | |
|---|---|---|---|---|
| 4,568,846 A | * | 2/1986 | Kapadia | 310/156.83 |
| 4,939,398 A | * | 7/1990 | Lloyd | 310/156.53 |
| 5,159,220 A | * | 10/1992 | Kliman | 310/156.56 |
| 5,359,248 A | * | 10/1994 | Nagate et al. | 310/156.49 |
| 5,790,620 A | * | 8/1998 | Okazaki et al. | 376/305 |
| 5,846,054 A | * | 12/1998 | Mannava et al. | 416/219 R |
| 5,936,323 A | * | 8/1999 | Shibukawa et al. | 310/156.53 |
| 6,208,054 B1 | * | 3/2001 | Tajima et al. | 310/46 |
| 6,218,753 B1 | * | 4/2001 | Asano et al. | 310/156.53 |
| 6,369,478 B1 | * | 4/2002 | Koharagi et al. | 310/156.48 |
| 6,536,109 B2 | * | 3/2003 | Berthelet et al. | 29/889.1 |
| 6,566,629 B1 | * | 5/2003 | Dulaney et al. | 219/121.74 |
| 6,622,570 B1 | * | 9/2003 | Prevey, III | 73/826 |
| 6,727,628 B2 | * | 4/2004 | Shimada et al. | 310/216 |
| 2003/0121567 A1 | * | 7/2003 | Sugiyama et al. | 148/120 |
| 2003/0219621 A1 | * | 11/2003 | Sodani et al. | 428/659 |

FOREIGN PATENT DOCUMENTS

| | | | | |
|---|---|---|---|---|
| JP | WO-009207407 | * | 4/1992 | H02K/1/27 |
| JP | 000552365 | * | 7/1993 | H02K/1/27 |
| JP | 10304610 | * | 11/1998 | H02K/1/27 |
| JP | P2001-16809 A | | 1/2001 | |
| JP | 2002512162 | * | 4/2002 | H02K/19/10 |

OTHER PUBLICATIONS

"Development of Stress Improvement Technique Using Pulse Laser Irradiation Evaluation of Stress Improvement for Type 304 Stainless Steel" by Minoru Obata, Tatsuya Kubo, Yuji Sano, Masaki Yoda, Naruhiko Mukai, Seishi Shima, and Masanori Kanno.

* cited by examiner

Primary Examiner—Darren Schuberg
Assistant Examiner—Heba Elkassabgi
(74) Attorney, Agent, or Firm—McDermott Will & Emery LLP

(57) ABSTRACT

An electrical-steel-sheet formed body is provided with an opening portion into which a permanent magnet is inserted, and an outer-peripheral hardened portion formed on the electrical-steel-sheet formed body at an outer periphery side thereof for the opening portion and having a higher hardness than a remaining area of the electrical-steel-sheet formed body. The electrical-steel-sheet formed body can be used as the rotor of the built-in permanent magnet type rotary electric machine, and the built-in permanent magnet type rotary electric machine can be obtained.

20 Claims, 19 Drawing Sheets

ELECTRICAL-STEEL-SHEET FORMED BODY FOR ROTOR CORE, ROTOR, ROTARY ELECTRIC MACHINE AND RELATED METHOD

BACKGROUND OF THE INVENTION

The present invention relates to an electrical-steel-sheet formed body for a rotor core, a rotor, a rotary electric machine and a related method, and, more particularly, to an electrical steel sheet formed body for a rotor core of a built-in permanent magnet type rotary electric machine, a rotor using such a formed body for a built-in permanent magnet type rotary electric machine, a built-in permanent magnet type rotary electric machine using such a formed body, and a method of manufacturing an electrical-steel-sheet formed body for use in a rotor core of a built-in permanent magnet type rotary electric machine.

Built-in permanent magnet type rotary electric machines have heretofore been employed, for example, in electric vehicles and hybrid automobiles as drive motors. Among these, since synchronous motors in each of which permanent magnets are built in a rotor can be realized in high speed rotating capabilities, miniaturizations and light weights, the synchronous motors have many applications.

FIGS. 29 and 30 are views illustrating rotor cores for built-in permanent magnet type synchronous motors.

In FIGS. 29 and 30, both the rotor cores 100 have eight poles, with one magnet-insertion opening 101 being formed for one pole. Such a rotor core 100 is formed first by stamping an electrical steel sheet in a core shape as shown and then stacking a plurality of resulting thin plates in a direction perpendicular to a sheet of the figure. In the current specification, a sheet of thin plate forming the rotor core is referred to as an electrical-steel-sheet formed body because the thin plate is formed from the electrical steel sheet.

By the way, in usual practice, the motor can be miniaturized when rotated at a high speed. For this reason, attempts have heretofore been made in the past to develop the motors that have high speed rotating capabilities. However, when the rotor of such a built-in permanent magnet type motor rotates, the rotor develops a centrifugal force that is exerted to the magnets and increases as the rotational speed increases. Thus, the maximum rotation speed of the motor is limited to the strength of the electrical steel sheet per se used for the rotor.

On the contrary, the higher strength of the electrical steel sheet, the larger will be iron loss, with resultant heat being developed in the rotor. For this reason, even though the strength of the rotor is desired to increase, but a difficulty is encountered. This is because, if the rotor develops heat, the magnet loses a magnetic force due to resulting heat depending on the magnet which is used and, so, the temperature rise of the rotor must be avoided.

Japanese Patent Application Laid-Open Publication No. 2001-16809 discloses a technology related to a shape of a magnet-insertion opening that enables a stress concentration, occurred in a rotor core caused by a centrifugal force, to be dispersed in a wide area in order to provide high speed rotating capability of the rotor without the need for increasing iron loss of an electrical steel sheet.

In particular, as shown in FIGS. 31 and 32, attempts are made to form circular arc spaces 102 (see FIG. 31), 105 (see FIG. 32) that involve corners of magnet-insertion openings (slots) 101 where stresses are to be concentrated due to centrifugal forces and have larger radii of curvatures than those of the corners, in such a manner that the circular arc spaces 102, 105 function to dislocate the stress concentrations in the shortest areas between the outer peripheries 110 and the slots 101. Such a structure may resultantly allow the stress concentrations to be dispersed and alleviated.

Further, "Development of Stress Improvement Technique Using Pulse Laser Irradiation-Evaluation of Stress Improvement for Type 304 Stainless Steel" (By Minoru Oda, et al, "Material" Vol. 49, No.2, pp. 193–199, Issued on February, 2002) discloses a laser peening technology.

SUMMARY OF THE INVENTION

However, upon considerable studies conducted by the present inventors, in a case where the circular arc space is formed at the outer periphery area of the slot, such a structure is found to have inability of appropriately dispersing and alleviating the stress concentration depending on a shape or a size of the space and it is conceived that there is a tendency to hardly find out an effective demarcation per se for the shape and size of the circular arc space.

The present invention has been completed upon such studies and has an object to provide an electrical-steel-sheet formed body for use in forming a rotor core that is able to lower iron loss for thereby providing high speed rotating capability.

Further, it is another object of the present invention to provide a rotor that is able to lower iron loss for thereby providing high speed rotating capability and a rotary electric machine using such a rotor.

Furthermore, it is another object of the present invention to provide a method of manufacturing an electrical-steel-sheet formed body for use in a rotor core that is able to lower iron loss for thereby providing high speed rotating capability.

To achieve the above objects, an aspect of the present invention provides an electrical-steel-sheet formed body for use in forming a rotor core of an built-in permanent magnet type rotary electric machine, comprising: an opening portion into which a permanent magnet is inserted; and an outer-peripheral hardened portion formed on an electrical-steel-sheet formed body at an outer periphery side thereof for the opening portion and having a higher hardness than a remaining area of the electrical-steel-sheet formed body.

Further, another aspect of the present invention provides a rotor for an built-in permanent magnet type rotary electric machine, the rotor comprising: a permanent magnet; and an electrical-steel-sheet formed body having an opening portion for insertion of the permanent magnet and including an outer-peripheral hardened portion, which forms in the electrical-steel-sheet formed body at an outer periphery side thereof and which has a higher hardness than a remaining area of the electrical-steel-sheet formed body.

Furthermore, another aspect of the present invention provides a built-in permanent magnet type rotary electric machine, comprising: a stator; a winding disposed in the stator; and a rotor disposed in opposition to the stator. The rotor is provided with: a permanent magnet; and an electrical-steel-sheet formed body having an opening portion for insertion of the permanent magnet and including an outer-peripheral hardened portion, which is formed in the electrical-steel-sheet formed body at an outer periphery side thereof and which has a higher hardness than a remaining area of the electrical-steel-sheet formed body.

On the other hand, another aspect of the present invention provides a method of manufacturing an electrical-steel-sheet formed body for use in forming a rotor core of an built-in permanent magnet type rotary electric machine, the method comprising: preparing an electrical steel sheet; forming an opening portion in the electrical steel sheet for insertion of a permanent magnet therein; forming a contoured shape of the electrical steel sheet corresponding to a contoured shape of a rotor; and forming an outer-peripheral hardened portion on the electrical-steel-sheet formed body to have a higher hardness than a remaining area of the electrical steel sheet by applying an external action thereto such that the outer-peripheral hardened portion is located at an outer periphery side of the electrical steel sheet.

Other and further features, advantages, and benefits of the present invention will become more apparent from the following description taken in conjunction with the following drawings.

DETAILED DESCRIPTION OF THE PREFERRED EMBODIMENTS

Figure 1:
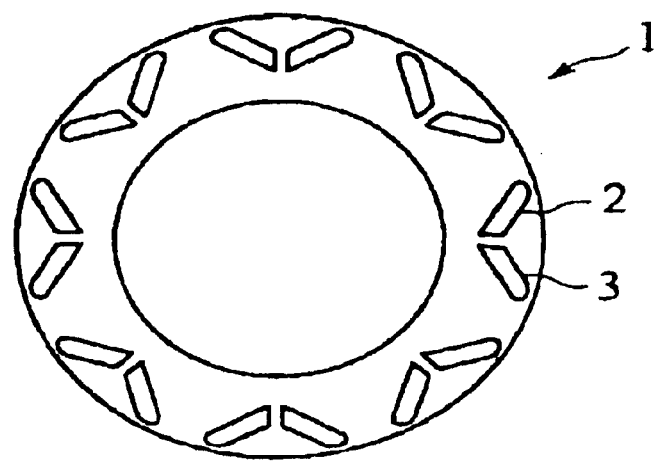
FIG. 1 is a plan view illustrating an electrical-steel-sheet formed body of a first embodiment according to the present invention.

Reference will now be made in detail to the accompanying drawings to describe an electrical-steel-sheet formed body for a rotor core of a built-in permanent magnet type rotary electric machine, a rotor using such a formed body for a built-in permanent magnet type rotary electric machine, a built-in permanent magnet type rotary electric machine using such a formed body, and a method of manufacturing an electrical-steel-sheet formed body for use in a rotor core of a built-in permanent magnet type rotary electric machine, in each embodiment of the present invention. Also, in the following description of the various embodiments, the same component parts bear the same reference numerals throughout the drawings to simplify or omit the redundant description.

(First Embodiment)

Initially, a first embodiment of the present invention is described.

Figure 2:
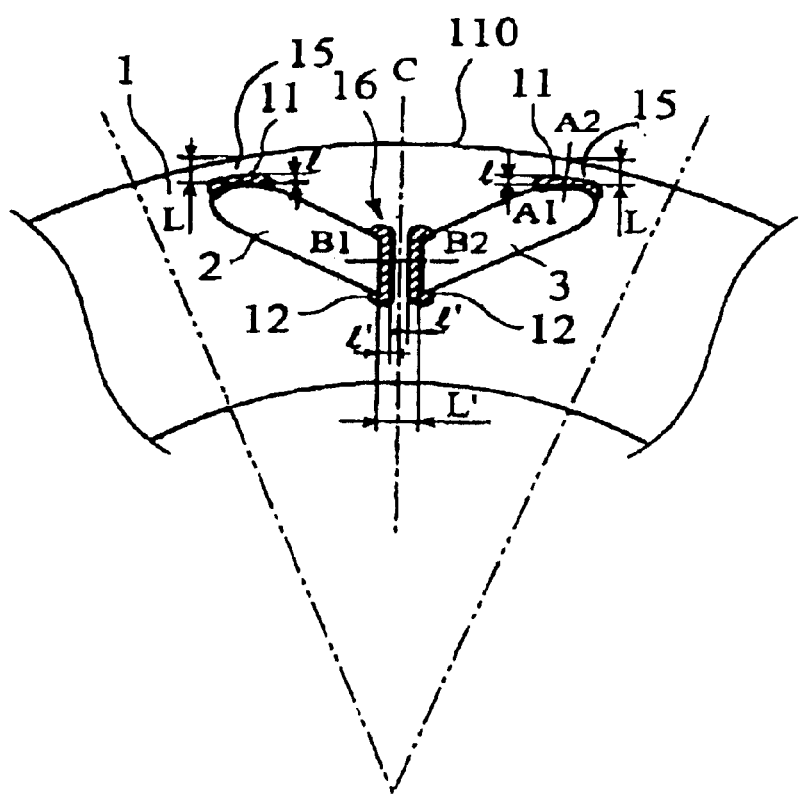
FIG. 2 is an enlarged view of a magnet-insertion opening portion of the electrical-steel-sheet formed body shown in FIG. 1, in the first embodiment.

FIG. 1 is a plan view illustrating an electrical-steel-sheet formed body of the presently filed embodiment, and FIG. 2 is an enlarged view of an opening portion adapted to insert associated magnets in the electrical-steel-sheet formed body. Also, hereinafter, the enlarged view of the magnet-insertion opening portion shows only one pole segment in principle for convenience's sake.

In FIGS. 1 and 2, when forming a rotor, the electrical-steel-sheet formed body 1 corresponds to a core of the rotor with two openings 2, 3 being formed for each pole to allow magnets to be inserted therein.

Also, hardened portions 11, 12 are formed at respective outer-peripheral areas of the two opening portions 2, 3 and at intervening area between two mutually adjacent opening portions 2, 3 for one pole, respectively, with each hardened portion being harder than the other areas of the electrical-steel-sheet formed body 1.

Here, the outer peripheral areas of the magnet-insertion opening portions 2, 3 refer to as outer bridge portions 15, and an area intervening between the adjacent opening portions for each pole refers to a central bridge area 16.

The hardened portions 11 (the outer-peripheral hardened portions formed in the outer bridge portions 15) are formed at the respective outer peripheries of the opening portions 2, 3 to be located in respective areas, in close proximity to the respective opening portions 2, 3, between the outermost sides (i.e., outer-peripheral edges of the respective openings) of the opening portions 2, 3 and an outer-peripheral portion 110 corresponding to an outer-peripheral portion of the rotor, that is, the outer-peripheral hardened portions 11 are formed in a range extending from the outer-peripheral edges of the opening portions 2, 3 toward a location away from the outer-peripheral portion 110, as shown by hatched areas each with a width l. That is to say, non-hardened portions exist in remoter areas than the outer peripheries of the outer-peripheral hardened portions 11, respectively.

The hardened portions 12 (the opening-opening hardened portions formed in the central bridge area 16) are formed at opposed areas of the adjacent ends of the opening portions 2, 3 to be located in respective areas, in close proximity to the respective opening portions 2, 3, of the central bridge area 16 between the outer-peripheral edges of the opening portions 2, 3 and a center line C extending between the outer-peripheral edges of both opening portions 2, 3, that is, the opening-opening hardened portions 12 are formed in a range extending from the outer-peripheral edges of the opening portions 2, 3 toward a location away from the center line C, as shown by hatched areas each with a width l'. That is to say, a non-hardened area exists in the central bridge area 16 between the adjacent hardened portions 12, 12.

Figure 3:
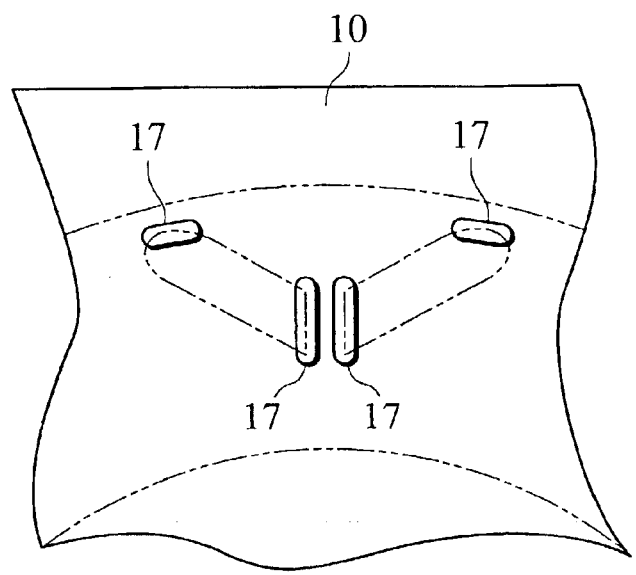
FIG. 3 is a plan view illustrating a manufacturing method of the electrical-steel-sheet formed body shown in FIG. 1, in the first embodiment.
Figure 4:
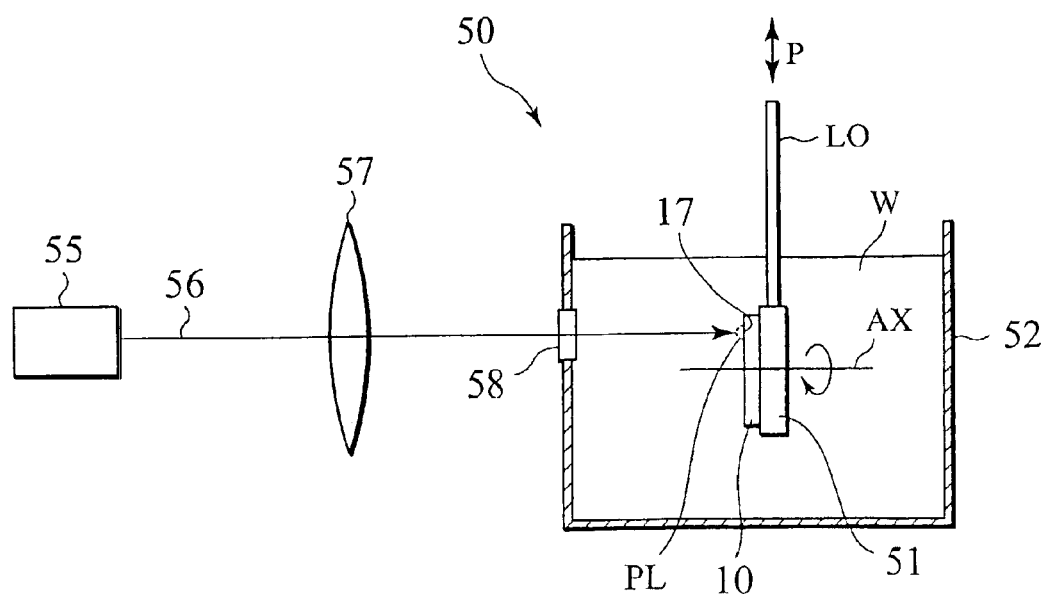
FIG. 4 is a schematic structural view of a laser peening apparatus to be used for the manufacturing method of the electrical-steel-sheet formed body, in the first embodiment.

FIG. 3 is a plan view for illustrating a method of manufacturing such an electrical-steel-sheet formed body 1, and FIG. 4 is a schematic structural view of a laser peening apparatus 50 for use in carrying out the method of manufacturing the electrical-steel-sheet formed body.

The electrical-steel-sheet formed body for use in the rotor core is formed so as to have the magnet-insertion opening portions and the outer contoured shape as the rotor, by stamping (punching and blanking) an original panel made of an electrical-steel-sheet by use of a press die (not shown).

With the presently filed embodiment, first, in order to form the outer-peripheral hardened portions 11 and the opening-opening hardened portions 12 laser peening is carried out to perform work hardening on areas 17, of the electrical steel sheet 10 prior to the stamping (punching and blanking) operation, involving areas to be formed with the outer-peripheral hardened portions 11 and the opening-opening hardened portions 12 in compliance with the final outer contoured shape as the rotor (shown by phantom lines in FIG. 3) to be obtained by die stamping (punching and blanking).

Then, the die stamping (punching and blanking) is carried out on the electrical steel sheet 10, thereby forming the rotor configuration with the magnet-insertion opening portions 2, 3.

In this way, the outer-peripheral hardened portions 11 and the opening-opening hardened portions 12 with the areas 17 being hardened can be formed.

More particularly, as shown in FIG. 4, the electrical steel sheet 10, for example, formed with a die stamping (punching) shape involving the magnet-insertion opening portions or the like, is placed on a stage 51 rotatably mounted on a rod member LO, which is moveable in a vertical direction P in a laser peening apparatus 50, with respect to an rotational axis AX, and under such a condition, the stage 51 is immersed in water W filled in a vessel 52. On the other hand, a Nd:YAG laser 55 is placed outside the vessel 52 so as to allow a pulse laser light 56, emitted from the laser 55, to propagate through an optical system 57 and a transparent window 58 into water W to be irradiated toward the electrical steel sheet 10. When this takes place, because of a plasma PL occurring at the surface of the electrical steel sheet 10, shock waves are generated at that place. The shock waves act on the area 17 that involves the area to be formed with the outer-peripheral hardened portion 11 or the area to be formed with the opening-opening hardened portion 12 such that the area 17 is subject to the peening treatment to be hardened, whereupon the stage 10 is sequentially rotated and moved to compel all of the areas 17 to be uniformly peened.

Now, the electrical-steel-sheet formed body, of the first embodiment according to the present invention, was fabricated in an actual practice by using the laser-peening technology set forth above, and test results are described below.

EXAMPLE 1

In the presently filed Example using the laser peening apparatus 50, first, an electrical steel sheet 35H300 made by Nippon Steel Corporation was prepared as the electrical steel sheet 10.

The laser peening was carried out to the areas 17 of the electrical steel sheet 10 in water W, so as to form the outer-peripheral hardened portions 11 and the opening-opening hardened portions 12 under conditions in that the Nd:YAG laser 55 emitted and irradiated a green laser pulse light with a wavelength of 532 nm at a pulse energy of 200 mJ and in a spot diameter of 0.8 mm to the areas 17, wherein a pulse density was 3600 pulses/cm$^2$. After the laser peening, there was no variation in thickness of the electrical steel sheet 10.

Subsequently, after the laser peening has been completed, die stamping (punching and blanking) was carried out to form the electrical-steel-sheet formed body 1 for the rotor core as shown in FIG. 1.

After the die stamping (punching and blanking), the electrical-steel-sheet formed body 1 had the bridge width (i.e., a width of the area of the electrical steel sheet 10 along line A1–A2 and a width of the area of the electrical steel sheet 10 along line B1–B2 in FIG. 2) of 1.5 mm. Also, the rate of surface area of the hardened portions 11, 12 to a total surface area of the electrical-steel-sheet formed body was approximately 7.8%. Also, no warping the steel sheet resulted.

As described above, the original electrical steel sheet was laser peened and, thereafter, die stamped (punched and blanked) to form the electrical-steel-sheet formed body 1 that formed the test piece of Example 1.

EXAMPLE 2

In the presently filed Example, for the purpose of obtaining the electrical-steel-sheet formed body 1 as a test piece, the order in a sequence of the steps carried out in Example 1 was altered such that, after firstly die stamping (punching and blanking) the electrical steel sheet 10 to form the test piece formed with the outer contoured shape and the opening portions as the rotor core, the laser peening was carried out to allow the test piece to have the same hardened portions 11, 12 as those shown in FIG. 2. During this peening process, the laser peening was carried out under the conditions in that only the spot diameter was altered to a value of 0.4 mm, with the other parameters remained unchanged as in Example 1.

Resulting electrical-steel-sheet formed body 1 had the bridge width of 1.5 mm, with resultant observation being found in almost no variation in thickness of the steel sheet after the peening. Also, no warping of the steel sheet resulted.

As described-above, the original electrical steel sheet was first die stamped (punched and blanked) and, thereafter, the resulting test piece was laser peened, thereby forming the electrical-steel-sheet formed body 1 as the test piece of Example 2.

COMPARATIVE EXAMPLE 1

In the current Comparative Example, for the purpose of obtaining the electrical-steel-sheet formed body as a test piece, only the die stamping (punching and blanking) of the electrical steel sheet was carried out to form the test piece having the outer contoured shape and the opening portions as the rotor core, with no hardening treatment such as the peening being implemented. Also, the rotor core had the bridge width of 1.5 mm similar in value to the above Examples.

As described above, the original electrical steel sheet was only die stamped (punched and blanked) with no laser peening treatment, thereby forming the electrical-steel-sheet formed body 1 as the test piece of Comparative Example 1.

Hardness Measurements

Hardness tests for the test pieces resulted in Examples 1 and 2 and Comparative Example 1 stated above were conducted.

More particularly, hardness tests were conducted for the above test pieces along a line A1–A2 and a line B1–B2, respectively, as shown in FIG. 2 by a Vickers Hardness Test based on JIS Z2244.

Figure 5A:
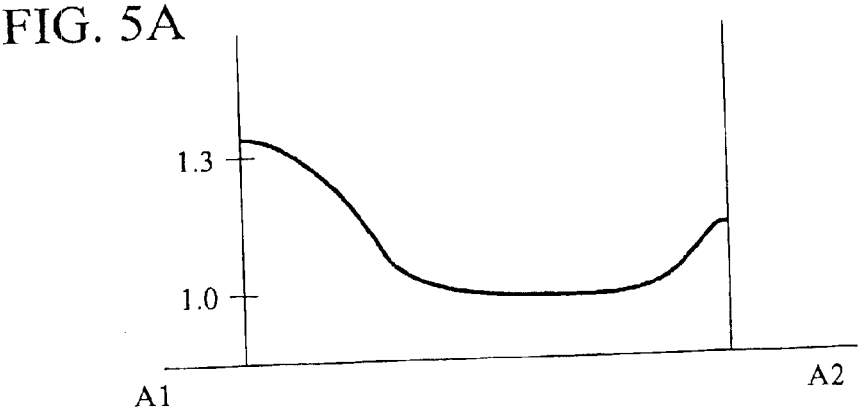
FIG. 5A is a graph illustrating a hardness distribution measured, along line A1–A2 of FIG. 2, and obtained by a test piece of Example 1, in the first embodiment.
Figure 5B:
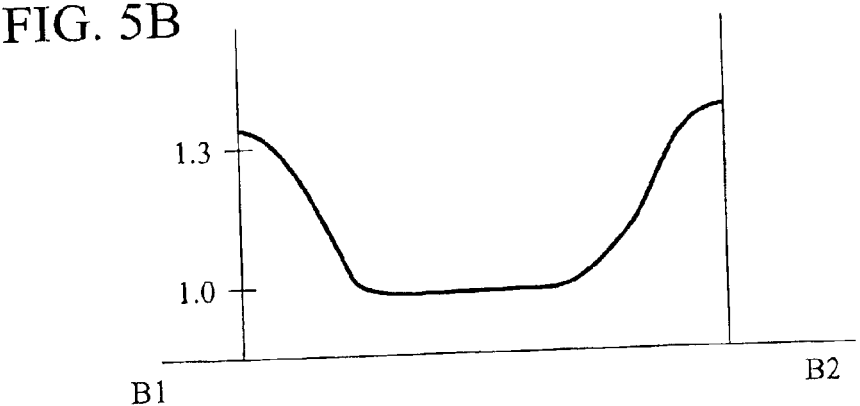
FIG. 5B is a graph illustrating a hardness distribution measured, along line B1–B2 of FIG. 2, and obtained by a test piece of Example 1, in the first embodiment.

FIGS. 5A and 5B are views illustrating hardness distributions resulting from hardness tests measured for the test piece of Example 1, and FIG. 5A illustrates a hardness distribution (with the abscissa axis showing a position along the line A1–A2, and the ordinate axis showing the magnification, where hardness of the original electrical steel sheet was assigned to have a value of 1, resulted when measuring the Vickers hardness) obtained when measuring hardness along the line A1–A2 shown in FIG. 2, while FIG. 5B illustrates a hardness distribution (with the abscissa axis showing a position along the line B1–B2, and the ordinate axis showing the magnification, where hardness of the original electrical steel sheet was assigned to have a value of 1, resulted when measuring the Vickers hardness) obtained when measuring hardness along the line B1–B2 shown in FIG. 2.

As seen in FIGS. 5A and 5B, the test piece of Example 1 revealed the maximum hardness, which reached at a rate of 1.35 times, with respect to the harness of the original base material (electrical steel sheet), to be greater than that of the original base material, at the areas of the outer-peripheral hardened portions 11 and the opening-opening hardened portions 12. Also, in FIG. 5A, hardness increases at an area closer to the A2 side, because this results from hardening effect caused during die stamping (blanking) operation.

Further, as a result of conducting hardness measurement for the test piece of Example 2, although not shown in the figure, the test piece had the same result as that of Example 1, with the test piece having hardness at the rate of approximately 1.35 times greater than the harness of the original base material at the areas of the outer-peripheral hardened portions 11 and the opening-opening hardened portions 12.

Figure 6A:
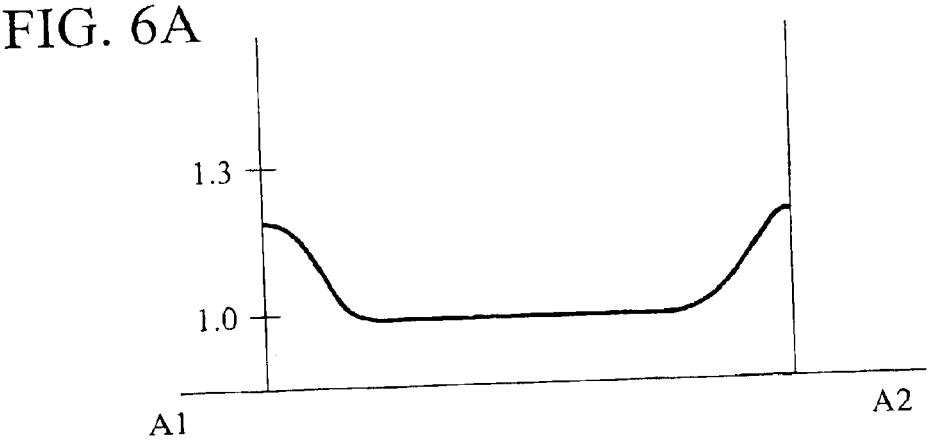
FIG. 6A is a graph illustrating a hardness distribution measured, along line A1–A2 of FIG. 2, and obtained by a test piece of Comparative Example 1, in the first embodiment.
Figure 6B:
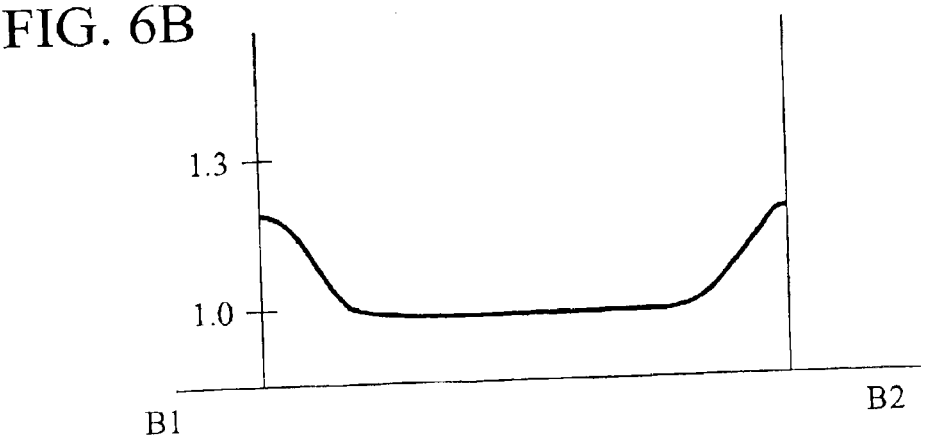
FIG. 6B is a graph illustrating a hardness distribution measured, along line B1–B2 of FIG. 2, and obtained by a test piece of Comparative Example 1, in the first embodiment.

Next, FIGS. 6A and 6B are views illustrating hardness distributions resulting from hardness tests measured for the test piece of Comparative Example 1, and FIG. 6A illustrates a hardness distribution (with the abscissa axis showing a position along the line A1–A2, and the ordinate axis showing the magnification, where hardness of the original electrical steel sheet was assigned to have a value of 1, resulted when measuring the Vickers hardness) obtained when measuring hardness along the line A1–A2 shown in FIG. 2, while FIG. 6B illustrates a hardness distribution (with the abscissa axis showing a position along the line B1–B2, and the ordinate axis showing the magnification, where hardness of the original electrical steel sheet was assigned to have a value of 1, resulted when measuring the Vickers hardness) obtained when measuring hardness along the line B1–B2 shown in FIG. 2.

As shown in FIGS. 6A and 6B, the test piece of Comparative Example 1 revealed slightly increased hardened portions at stamped (punched and blanked) areas in close proximity to the outer circumferential periphery and the magnet-insertion portions of the test piece. However, these are caused by hardening effect resulted when merely carrying out the die stamping (punching and blanking), and the test piece had those hardness areas lower than those of the test pieces of the above Examples.

Rotation Tests

Figure 7:
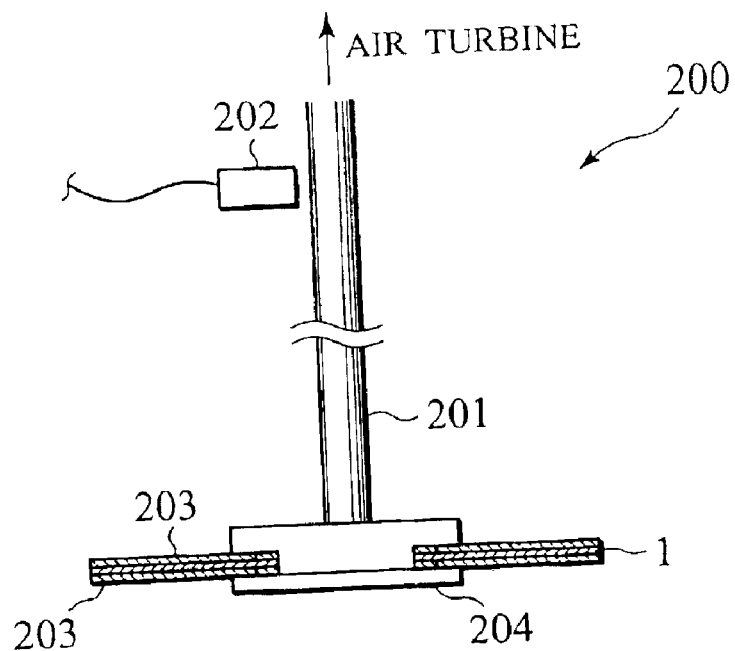
FIG. 7 is a schematic view of a rotation test apparatus for conducting rotation tests for various test pieces, in the first embodiment.

Rotation tests were conducted for the test pieces resulted in Examples 1 and 2 and Comparative Example 1 using a rotation test apparatus 200 shown in FIG. 7.

The rotation test apparatus 200 is comprised of a spindle 201 adapted to be rotated by an air turbine, a distance sensor (of a non-contact and electromagnet type) 202 that measures an axial run-out (sway) of a center axis of the spindle 201, a pair of slide plates 203 between which one sheet of the electrical-steel-sheet formed body (test piece) 1 prepared as the rotor core embedded with dummy magnets is sandwiched, and a pressure member 204 disposed beneath the spindle 201 to urge the slide plates 203. Also, the rotation test apparatus 200 per se is located inside a chamber, not shown, which is evacuated to be held under a vacuum condition. This is because of the fact to remove effects of frictional heat developed by atmospheric air. Moreover, the rotation test apparatus 200 is held under a circumstance below a room temperature, and the rotation tests were conducted at the room temperature.

During the rotation tests, the dummy magnets were embedded in the magnet-insertion bores of respective test pieces. Each dummy magnet had a density of 7.5 g/cm$^3$ and the same thickness as that of the test piece.

During testing of the test pieces with the rotation test apparatus, if a plastic deformation, i.e., the distortion occurs in the test piece, the run-out of the center axis results in the rotational axis (spindle) of the rotation test apparatus and, hence, monitoring the run-out of the center axis of the rotational axis (spindle) enables the occurrence of the plastic deformation to be detected.

Figure 8:
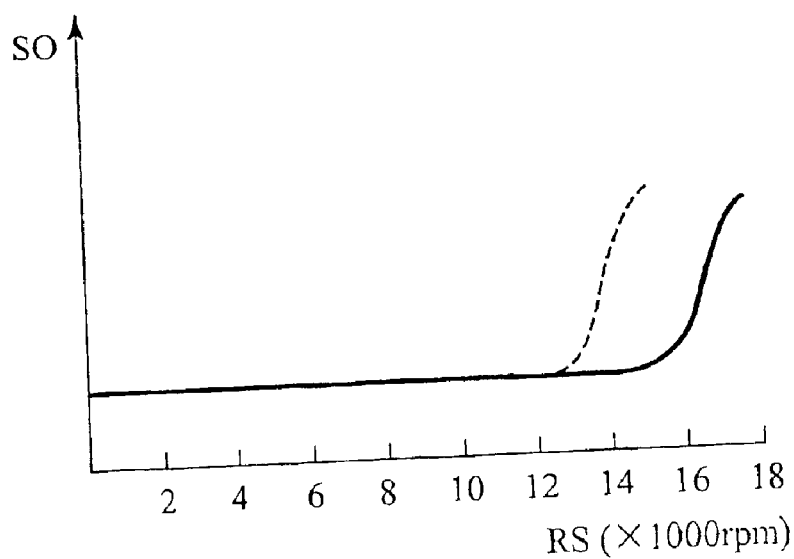
FIG. 8 is a view illustrating occurrence of a rotational run-out of a center core axis found in the rotation test in FIG. 7, in the first embodiment.

As shown in FIG. 8, the rotation speed RS (×1000 rpm) is gradually increased as shown by the abscissa axis of FIG. 8, and the rotation speed, at which an output value SO (i.e., represented at an arbitrary unit in the ordinate axis in FIG. 8) generated by the distance sensor 202 exceeds a value greater than 50%, was assigned to be the number of revolution indicative of the occurrence of the plastic deformation. As will be described hereinafter, since such a rotation speed is substantially in correspondence with the amount of the run-out of the rotational axis when the deformation occurs in the dummy rotor with a resultant variation in dimension of the outer contoured shape in a range of 0.1 mm, the variation indicative of the amount of the run-out of the rotational axis at the rate of 50% was assigned to be an index indicative of the occurrence of the plastic deformation.

As shown in FIG. 8, when conducting the rotation tests set forth above, the run-out occurred in the rotational axes of the test pieces of Examples 1 and 2 at the rotation speed of 16000 rpm as shown by a solid line in FIG. 8.

On other hand, the run-out occurred in the rotational axis of the resulting test piece, with no hardened portions, of Comparative Example 1 formed only by die stamping (punching and blanking) at the timing at which the rotation speed reached 13000 rpm as shown by a doted line in FIG. 8.

From the foregoing test results, it can be understood that the presence of the hardened portions formed at partial areas of the outer peripheries of the magnet-insertion opening portions and the end portions of the respective adjacent opening portions enables the rotor core to have high speed rotating capability.

Now, an analyzed result concerning the stress of the electrical-steel-sheet formed body 1 is described below.

Such a stress analysis was conducted on the electrical-steel-sheet formed body 1, in which the magnets are embedded in the magnet-insertion opening portions, by carrying out an elasticity analysis based on a finite element method (FEM) to obtain a stress distribution by performing calculation based on centrifugal forces specifically exerted to the magnets, when the electrical-steel-sheet formed body 1 is rotated.

As a result of the stress analysis, it has been found that there is a stress concentration at each of areas of the outer bridge portions closer to the magnets and at root portions of the central bridge area, and that a stress value of the stress concentration of each outer bridge portion closer to each magnet is larger than that of the central bridge area.

Then, several prototypes of the dummy rotors were prepared, and the above-described rotation tests were conducted to study how the plastic deformation initiates and proceeds. Here, each of the dummy rotors was made from one sheet of the electrical-steel-sheet formed body 1 with the magnet-insertion opening portions being embedded with the dummy magnets corresponding to one sheet of the electrical-steel-sheet formed body 1. Also, the rotor shape was formed by wire cutting.

Before the rotation tests using such dummy magnets, a preliminary prediction was made to identify which of the rotation speeds caused the plastic deformation to begin and proceed by implementing the stress analysis set forth above, and several kinds of rotation speeds, at which the tests are to be interrupted, was preliminarily determined. Then, during the rotation tests using the dummy magnets, the rotor samples whose tests were interrupted at such preliminarily determined rotation speeds were obtained.

And, by using the respective rotor samples, the degree of the plastic deformation was checked. The degree of such a plastic deformation was observed based on an etch pit method and estimated in a size of a surface area of a region where etch pits occurred.

As a result, it was found out that the plastic deformation begun from the stress concentration areas at the outer bridge portions in a VonMises stress distribution. Also, it was found out that the plastic deformation started when the maximum stress (VonMises stress) reached a value of the yield stress (i.e., at the rotation speed) derived from a tension test of the material (electrical steel sheet). Of course, it was cleared that the plastic deformation begun and proceeded with an increase in the rotation speed even at the stress concentration area at the root portion of the central bridge area.

Further, when conducting the rotation tests of such dummy rotor, as the deformation proceeds, the run-out of the center axis of the rotational shaft (spindle) of the rotation test apparatus occurs. This results from imbalance on a rotating balance of the dummy rotor. Consequently, monitoring the run-out of the center axis of the rotational shaft of the rotation test apparatus enables the degree of the plastic deformation of the dummy rotor to be detected.

Here, it is possible to use the run-out of the center axis of the rotation test apparatus when the deformation occurs in the dummy rotor with a resultant variation in dimension of the outer contoured shape in a range of 0.1 mm (to be permanent) as an index indicative of the plastic deformation. As the result of the experimental test, variation occurred in dimension of the dummy rotor, which was encountered with the run-out of the rotational axis at the amount of approximately 50%, in a range of 0.1 mm and therefore, during the rotation test, the maximum rotation speed (the highest rotation speed) was determined at the rotation speed at which the run-out of the rotational axis occurred in the range of 50% and the plastic deformation was deemed to occur in the dummy rotor.

Further, it could be recognized from observation of the etch pit occurring area that the condition, where there were clearly variations in dimension of the outer contoured shape, appeared due to the presence of the plastic deformation that proceeded and penetrated through the bridge portion.

As results of tests for Examples 1 and 2 and Comparative Example 1 and results of the stress analysis, it is concluded that, since the stress distribution in the stress concentration portions appears to be maximum at the bridge portion, only the portions of the bridge portions where the stresses are mostly concentrated suffice to be strengthened as shown in FIGS. 5A and 5B. Also, the degree of such hardness may be determined and actualized such that hardness exceeds the VonMises stress value at a targeted maximum rotation speed (i.e., the yield stress may be superior). Of course, needless to say, hardness may have an inclined distribution provided that hardness has a resistance to the VonMises stress value at the targeted maximum rotation speed. Also, a similar consideration may be applied to the region in the longitudinal length of the bridge portion.

Next, study was conducted to see the relationship between hardness of material forming the electrical steel sheet and the strength thereof.

As a result, it was confirmed that there was a proportional relationship between a rate of increase in hardness of material and a rate of increase in the yield stress of the material. This is meant by the fact that, when hardness of material increases at a rate of 30% with respect to hardness of its base material, the associated yield point strength deems to increase at a rate of 30% with respect to the strength of its base material.

From the foregoing description, in order to restrain the dimension change of the outer contoured shape of the electrical-steel-sheet formed body 1 within 0.1 mm, hardness of each of the outer-peripheral hardened portions 11 and the opening-opening hardened portions 12 of the electrical-steel-sheet formed body may be preferably determined to have a value 1.3 times greater than that of the base substance and, more preferably, in a range 1.35 times greater than that of the base substance. Also, if the material has too high hardness, in contrast, the material becomes brittle to cause micro cracks to tend to occur, hardness of the hardened portion may have an upper limit in a range approximately 2.5 times greater than that of the base substance.

Further, as to a surface area of the hardened portions (including the outer-peripheral hardened portions 11 and the opening-opening hardened portions 12) of the electrical-steel-sheet formed body, a total sum of the surface areas of the hardened portions may lie in a range equal to or greater than 1% and equal to or less than 20% of the whole surface area of the electrical-steel-sheet formed body. This is due to the fact that, if the total sum of the surface areas of the hardened portions exceeds a value of 20%, then entire iron loss of the rotor increases with a resultant increase in a heat value and, therefore, such an issue is addressed to reduce the entire iron loss while obtaining sufficient strength. Also, the total sum of the hardened portions may preferably have a lower limit that falls at least in a range of approximately 1% even though such a rate may differ depending on the targeted rotation speed, the shape of the opening portion and mass of the magnet. If the lower limit is less than 1%, then there is a probability in which the hardened portion cannot resist to the stress concentration.

As set forth above, with the structure of the presently filed embodiment, it is possible to provide the rotor core using the electrical-steel-sheet formed body that resists high speed rotation.

And, by using the rotor employing such an electrical-steel-sheet formed body, the rotary electric machine is enabled to have high speed rotating capability with an additional advantageous effect of achieving miniaturization of the rotary electric machine. This is because of the fact that, although required strength is proportional to the square of the rotation speed, as hardness increases, strength also increases. On the other band, if no change is made in the diameter of the rotor of the rotary electric machine, the presence of the high speed rotating capability enables the motor torque output to be reduced by ten and more %, it becomes possible to reduce a thickness of the stacked electrical-steel-sheet formed bodies (the number of stacks) forming the rotor when manufacturing the motor and, thus, miniaturization of the rotary electric machine can be achieved.

(Second Embodiment)

Next, a second embodiment of the present invention is described below.

Figure 9:
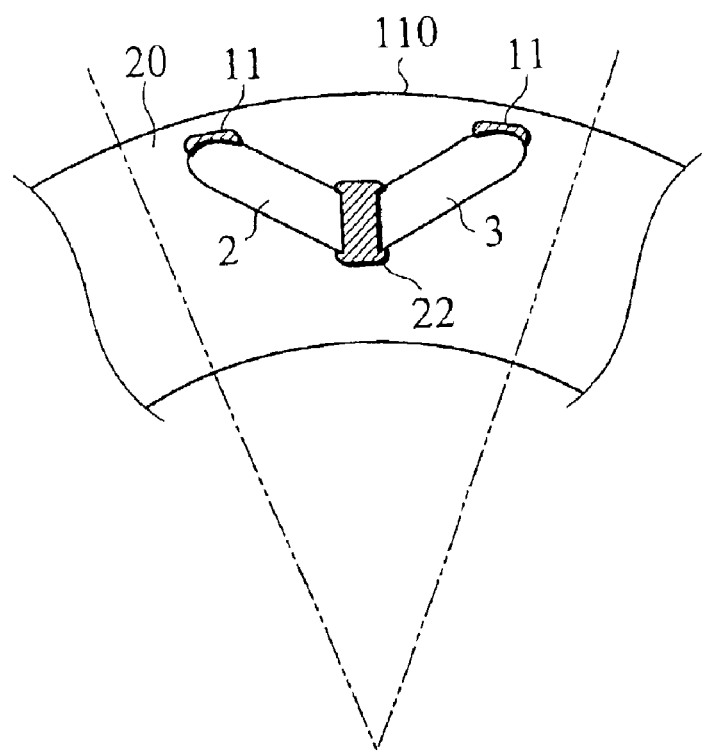
FIG. 9 is an enlarged view of a magnet-insertion opening portion of an electrical-steel-sheet formed body of a second embodiment according to the present invention.

FIG. 9 is an enlarged view of magnet-insertion opening portions of an electrical-steel-sheet formed body for use in forming a rotor of the presently filed embodiment.

In FIG. 9, the electrical-steel-sheet formed body 20 fundamentally has the same structure as the electrical-steel-sheet formed body of the first embodiment set forth above and has two opening portions 2, 3 for permitting two magnets to be inserted therein for each pole.

The two opening portions 2, 3 have respective outer-peripheral hardened portions 11 and an opening-opening hardened portion 22, which are formed at outer-peripheral areas of the respective opening portions 2, 3 and at an intervening area between the opening portions 2, 3, with each hardened portion being harder than the other remaining areas.

Here, the outer-peripheral hardened portions 11 have the same structures as those of the first embodiment and are formed in areas closer to respective outer-peripheral edge portions of the opening portions 2, 3 such that each hardened portion 11 does not extend to an outer circumferential periphery 110 of the rotor core. That is, there exist non-hardened areas beyond outer peripheries of the outer-peripheral hardened portions 11.

On the other hand, an intervening area between the adjacent opening portions 2, 3 is entirely hardened to form the opening-opening hardened portion 22. That is, a whole of a central bridge area is hardened.

Next, an electrical-steel-sheet formed body of the presently filed embodiment was actually fabricated and test was conducted with a result being described below.

EXAMPLE 3

When fabricating a test piece of the presently filed embodiment, first, an electrical steel sheet 35H300 made by Nippon Steel Corporation was prepared as an original electrical steel sheet like in Example 2 set forth above whereupon die stamping (punching and blanking) was carried out first to form a rotor shape with opening portions, and, subsequently as shown in FIG. 9, laser peening was carried out to form the outer-peripheral hardened portions 11 and the opening-opening hardened portion. The laser peening was conducted under the same condition as that of Example 2.

With such a test piece, hardness of each hardened portion had a value 1.35 times greater than that of the base substance. The test piece had a bridge width of 1.5 mm. Almost no variation occurred in thickness of the steel sheet after peening operation and, also, no warping occurred in the steel sheet.

As set forth above, the laser peening was carried out to allow the test piece to be formed with the outer-peripheral hardened portions 11 and the opening-opening hardened portion 22, thereby forming the electrical-steel-sheet formed body as the test piece of Example 3.

Rotation Test

The test piece obtained in Example 3 set forth above was subject to a rotation test.

The current test was conducted using the rotation test apparatus shown in FIG. 7. The test was carried out under the same condition as that of Example 1.

As a result of the rotation test, the run-out of the rotational axis occurred at the rotation speed of 15700 rpm.

Accordingly, it appears from the result of such rotation test that, although if the central bridge is entirely hardened, the test piece reaches an upper limit at a lower rotation speed than those of Examples 1 and 2 described above, the presence of the hardened portion entirely prepared in the central bridge enables the test piece to be rotated at a higher rotation speed than that of Comparative Example 1, set forth above, with no hardened portion being prepared.

(Third Embodiment)

Next, a third embodiment of the present invention is described below.

Figure 10:
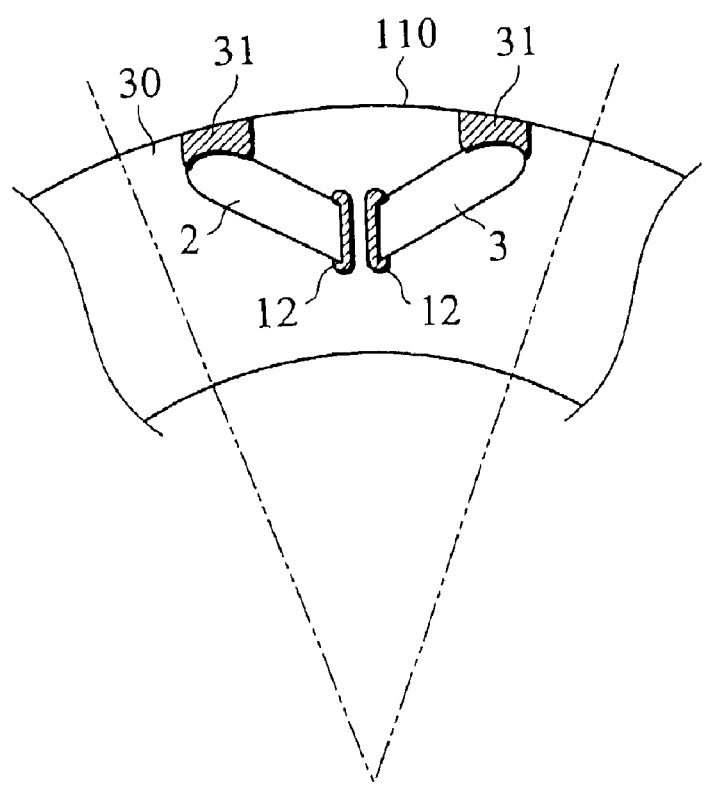
FIG. 10 is an enlarged view of a magnet-insertion opening portion of an electrical-steel-sheet formed body of a third embodiment according to the present invention.

FIG. 10 is an enlarged view of magnet-insertion opening portions of an electrical-steel-sheet formed body for use in forming a rotor of the presently filed embodiment.

In FIG. 10, the electrical-steel-sheet formed body 30 fundamentally has the same structure as the electrical-steel-sheet formed body of the first embodiment set forth above and has two opening portions 2, 3 for permitting two magnets to be inserted therein for each pole.

The two opening portions 2, 3 have respective outer-peripheral hardened portions 31 and respective opening-opening hardened portions 12, which are formed at outer-peripheral areas of the respective opening portions and at an intervening area between the opening portions to be harder than the other remaining areas.

Here, the outer-peripheral strengthened portions 31 have a structure different from the first embodiment and are formed in entire areas between respective outer peripheral areas of the opening portions 2, 3 and the outer circumferential periphery 110 of the rotor core. That is, the outer bridge portions near the respective outer peripheries of the opening portions 2, 3 are entirely hardened.

On the other hand, an intervening area between the adjacent opening portions 2, 3 is not hardened like in the structure of the first embodiment set forth above and, thus, the opening-opening hardened portions 12 are not mutually connected to allow a non-hardened portion to be created between the adjacent opening-opening hardened portions 12.

Next, an electrical-steel-sheet formed body of the presently filed embodiment was actually fabricated and test was conducted with a result being described below.

EXAMPLE 4

When fabricating a test piece of the presently filed embodiment, first, an electrical steel sheet 35H300 made by Nippon Steel Corporation was prepared as an original electrical steel sheet like in Example 2 set forth above whereupon die stamping (punching and blanking) was carried out first to form a rotor shape with opening portions, and, subsequently as shown in FIG. 10, laser peening was carried out to form the outer-peripheral hardened portions 31 and the opening-opening hardened portions 12. The laser peening was conducted under the same condition as that of Example 2.

With such a test piece, hardness of each hardened portion had a value 1.35 times greater than that of the base substance. The test piece had a bridge width of 1.5 mm. Almost no variation occurred in thickness of the steel sheet after peening operation and, also, no warping occurred in the steel sheet.

As set forth above, the laser peening was carried out to allow the test piece to be formed with the outer-peripheral hardened portions 31 and the opening-opening hardened portions 12, thereby forming the electrical-steel-sheet formed body as the test piece of Example 4.

Rotation Test

The test piece obtained in Example 4 set forth above was subject to a rotation test.

The current test was conducted using the rotation test apparatus shown in FIG. 7. The test was carried out under the same condition as that of Example 1.

As a result of the rotation test, the run-out of the rotational axis occurred at the rotation speed of 15000 rpm.

Accordingly, it appears from the result of such rotation test that, although if the outer bridge is entirely hardened, the outer bridge reaches an upper limit at a lower rotation speed than those of Examples 1 and 2 described above, the presence of the hardened portions partially prepared in the outer bridge enables the test piece to be rotated at a higher rotation speed than that of Comparative Example 1, set forth above, with no hardened portion being prepared in the outer bridge. Here, the results of the rotation tests conducted in Examples 1 to 4 and Comparative Example 1 are summarized and shown in the following Table 1.

TABLE 1

| | Contents | Results |
| --- | --- | --- |
| Example 1 | After Laser Peening, Die Stamping Conducted (See FIG. 2) | Run-out of Rotational Axis Occurred at 16000 rpm |
| Example 2 | After Die Stamping, Laser Peenig Conducted (See FIG. 2) | Run-out of Rotational Axis Occurred at 16000 rpm |
| Example 3 | After Die Stamping, Laser Peenig Conducted (See FIG. 9) | Run-out of Rotational Axis Occurred at 15700 rpm |
| Example 4 | After Die Stamping, Laser Peenig Conducted (See FIG. 10) | Run-out of Rotational Axis Occurred at 15000 rpm |
| Comparative Example 1 | Only Stamping Conducted | Run-out of Rotational Axis Occurred at 13000 rpm |

As will be understood with reference to Table 1, the rotation test results conducted in Examples 1 to 4 and Comparative Example 1 reveal that even in cases where the central bridge area or the outer bridge portions which are entirely hardened, respectively, an improvement in the rotation speed at which the test pieces can rotate with no run-out of the rotational axis appears (see Examples 3 and 4) and, in cases where both the central bridge area and the outer bridge portions are partially hardened (see Examples 1 and 2), the test pieces are enabled to rotate at a further higher rotation speed.

It is conceived that, if the central bridge or the outer bridge portions are entirely hardened, respectively, the above phenomenon result from an increased influence wherein those areas are entirely rendered brittle.

Accordingly, for the most desirable embodiment, it is preferable for the rotor core to have the central bridge area and the outer bridge portions formed with non-hardened regions extending in strip configurations such that the hardened portions exhibit benefits with no adverse affect being substantially caused because of brittleness.

To study the high speed rotating capability of the rotor core provided by the hardened areas formed in respective strip shapes more in detail, it becomes clear that it is more preferable for the hardened areas (typically shown by the width l in FIG. 2) to be formed in the outer bridge areas, in a range equal to or greater than ⅙ and equal to or less than ½ of the bridge width (typically shown by the width L in FIG. 2), respectively from the associated outer periphery edges of the opening portions at the stress concentration side, i.e., the areas near the outer periphery edges of the opening portions. Also, it becomes clear that it is more preferable for the hardened portions (typically shown by the width l' in FIG. 2) to be formed in the central bridge area, in a range equal to or greater than ⅙ and equal to or less than ⅓ of the bridge width (typically shown by the width L' in FIG. 2), respectively from the associated outer periphery edges of the opening portions at the stress concentration sides, i.e., the areas near the respective outer periphery edges of the mutually opposing opening portions.

Further, it is preferred that, among the peripheral areas of the magnet-insertion opening portions, the peripheral areas with no requirements in mechanical strength, i.e., the other peripheral areas than the bridge portions are not strengthened. This is because of the fact that larger the surface area of the hardened portions, the larger will be iron loss. For this reason, it is concluded that the surface areas of the hardened portions preferably falls in a range equal to or greater than 1% and equal to or less than 20% in terms of the surface area ratio of the electrical-steel-sheet formed body serving as the rotor.

(Fourth Embodiment)

Now, a fourth embodiment of the present invention is described below.

In the presently filed embodiment, the electrical-steel-sheet formed body (see FIGS. 1 and 2), for use as the rotor core with the same hardened portions as those of the first embodiment set forth above, was fabricated in a method different from that of the first embodiment, that is, the hardened portions were formed by plastic working.

FIGS. 11A to 14 are views for illustrating a sequence of steps to be carried out in a manufacturing method of the presently filed embodiment. Also, a two-dot-and-dash-line in the figures designates a phantom line representing a cutting shape of an opening portion.

Figure 11A:
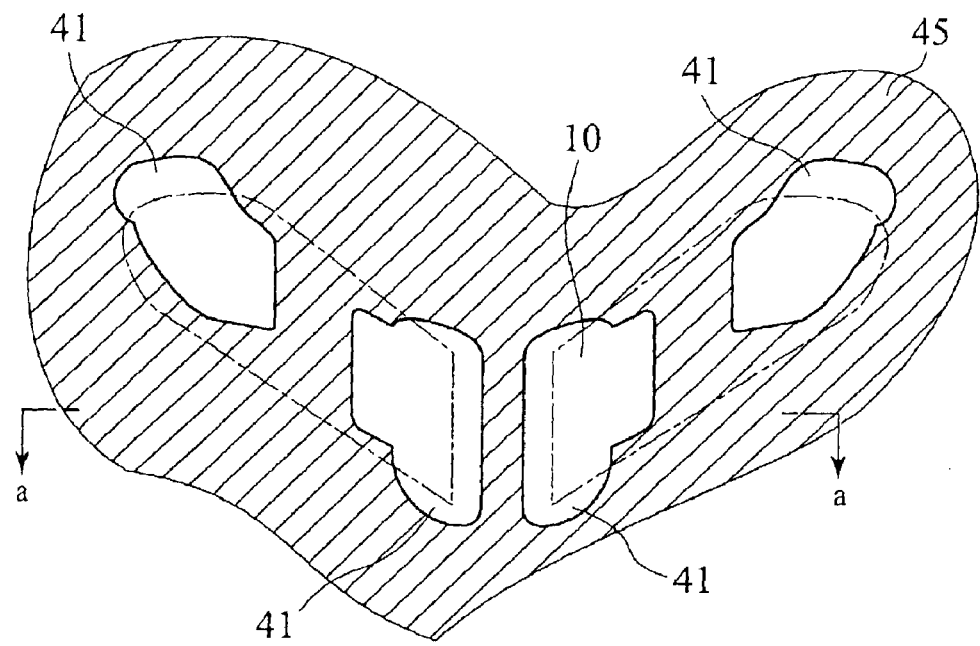
FIG. 11A is a plan view for illustrating a manufacturing method of a fourth embodiment according to the present invention.
Figure 11B:
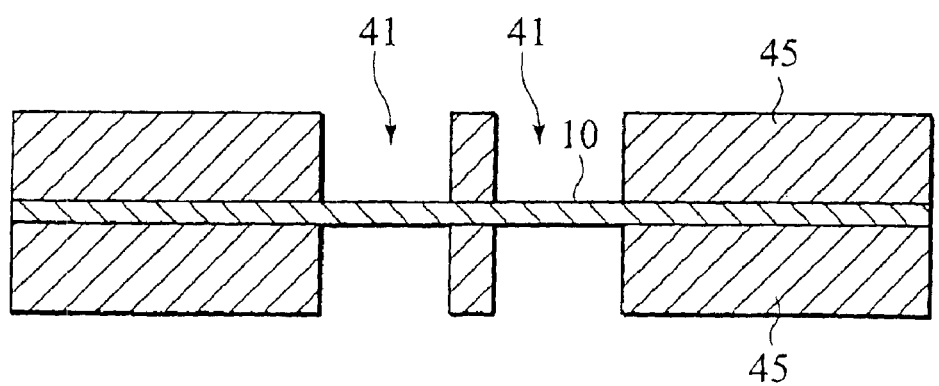
FIG. 11B is a cross sectional view taken along line a—a of FIG. 11A, in the fourth embodiment.

First, as shown in FIGS. 11A and 11B, an original electrical steel sheet 10 is kept in a sandwiched state between press dies 45 having openings 41. Also, FIG. 11A is a plan view for illustrating such step, and FIG. 11B is a cross sectional view taken on line a—a of FIG. 11A.

Figure 12:
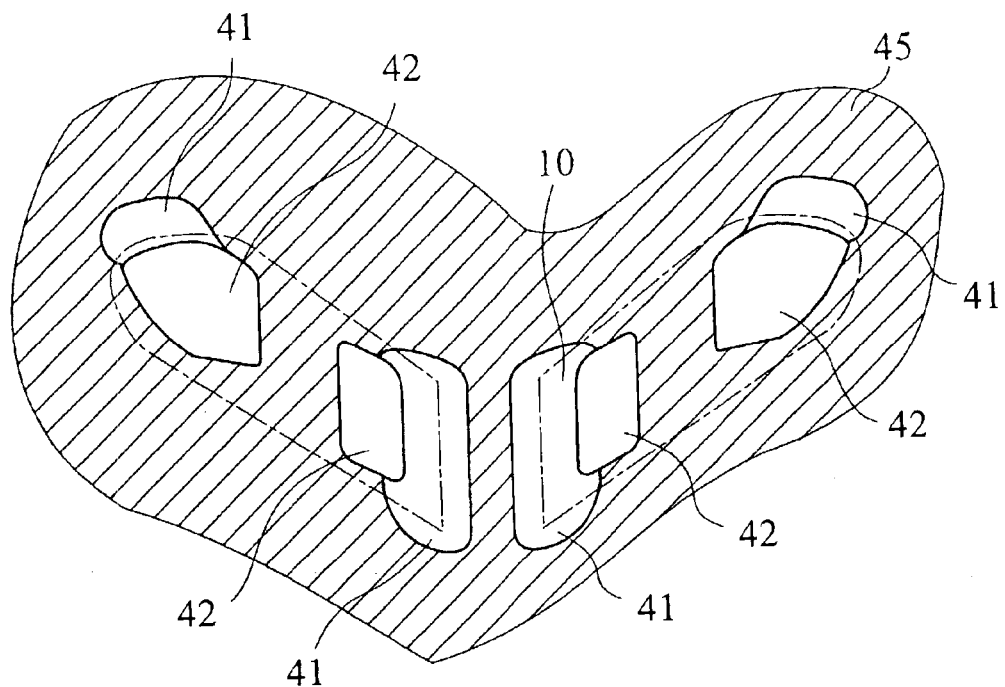
FIG. 12 is a view illustrating manufacturing steps subsequent to a step shown in FIG. 11A, in the fourth embodiment.

Next, under such a condition, as shown in FIG. 12, punches (not shown) are actuated through the openings 41 to form bores 42 in the original electrical steel sheet 10 at positions close proximity to areas to be formed with hardened portions in associated magnet-insertion opening portions.

Figure 13:
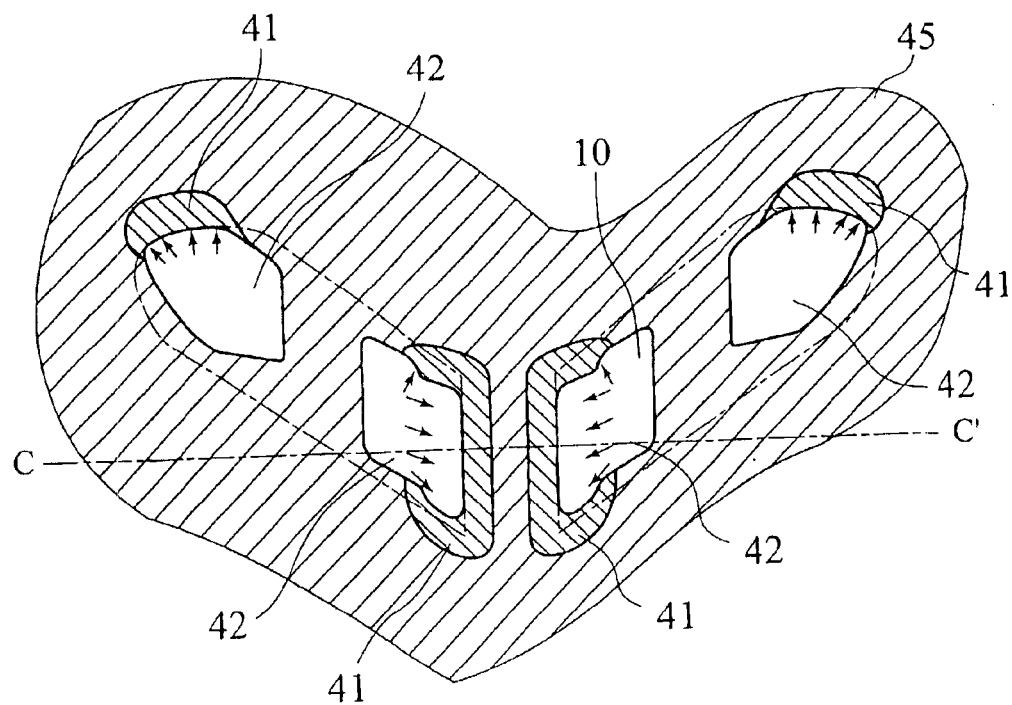
FIG. 13 is a view illustrating manufacturing steps subsequent to a step shown in FIG. 12, in the fourth embodiment.

Subsequently, as shown in FIG. 13, bars (punches), though not shown, are inserted to the bores 42, thereby performing compression workings in a direction as shown by an arrow. When this takes place, the workings are carried out at a rate of approximately 50%. After completing such compression workings, the pressure plates 45 are removed from the electrical steel sheet 10 which is consequently released.

Here, upon compression steps being performed as described above, the areas, which are compression worked, have increased thickness. Such a status is shown in FIG. 14A that is a cross sectional view taken along line C–C' of FIG. 13.

Figure 14A:
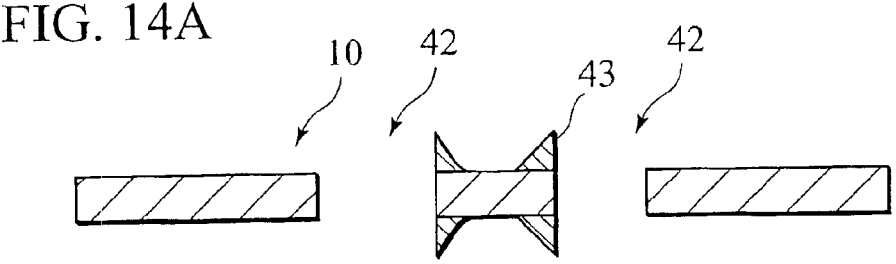
FIG. 14A is a cross sectional view taken along line C–C' of FIG. 13 and illustrating manufacturing steps subsequent to a step shown in FIG. 13, in the fourth embodiment.
Figure 14B:
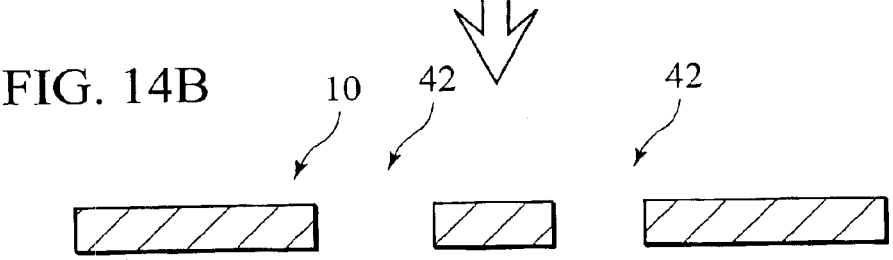
FIG. 14B is a cross sectional view illustrating manufacturing steps subsequent to a step shown in FIG. 14A, in the fourth embodiment.

As shown in FIG. 14A, the compression worked area becomes protuberant to form buildup portions 43. Then, these buildup portions are subject to grinding to be flattened as shown in FIG. 14B.

Thereafter, in order to form a rotor core, die stamping (punching and blanking) is carried out using the press, not shown, thereby obtaining an electrical-steel-sheet formed body.

Next, the electrical-steel-sheet formed body of the presently filed embodiment was actually fabricated and test was conducted with a result being described below.

EXAMPLE 5

When fabricating a test piece of the presently filed embodiment, first, an electrical steel sheet 35H300 made by Nippon Steel Corporation was prepared as an original electrical steel sheet and the manufacturing method using the compression workings set forth above were carried out to fabricate a test piece formed with hardened portions as shown in FIG. 2.

With such a test piece, hardness of the hardened portion had a value 1.3 times greater than that of the base substance. The test piece had a bridge width of 1.5 mm. No warping occurred in the sheet.

As set forth above, the steel sheet was subject to the compression workings to form the hardened portions, thereby forming the electrical-steel-sheet formed body as the test piece of Example 5.

Rotation Test

The test piece obtained in Example 5 set forth above was subject to a rotation test.

The current test was conducted using the rotation test apparatus shown in FIG. 7. The test was carried out under the same condition as that of Example 1.

As a result of the rotation test, the run-out of the rotational axis occurred at the rotation speed of 15000 rpm.

Accordingly, it appears from the result of such rotation test that, even in a case where the hardened portions are formed in the test piece by the plastic workings as in the presently filed embodiment, the test piece is enabled to rotate at a highly increased rotation speed.

Also, although the presently filed embodiment has been described above as the method wherein the bores for allowing the plastic workings to be carried out are first formed in the steel sheet at the areas corresponding to the magnet-insertion opening portions prior to forming the rotor whereupon the plastic workings are carried out, in place of carrying out such a method, it may be altered such that, when forming the rotor shape by die stamping (punching and blanking), the steel sheet is formed with, in addition to the rotor shape, opening portions smaller in size than the magnet-insertion opening portions to be used whereupon the plastic workings are performed at the opening portions, smaller in size than those to be actually used, to form the associated hardened portions and, thereafter, areas whose thickness are increased due to the plastic workings are shaped to be a flat surface, while forming the opening portions in size to be compliance with the magnet-insertion opening portions.

(Fifth Embodiment)

Now, a fifth embodiment of the present invention is described below.

In the presently filed embodiment, an electric motor is fabricated specifically and typically using the electrical-steel-sheet formed body for the rotor core described in conjunction with Example 2 of the first preferred embodiment. Also, such a motor is enabled to have a function of an electric power generator when using the motor not in a drive power mode but in an electric power generating mode.

Figure 15:
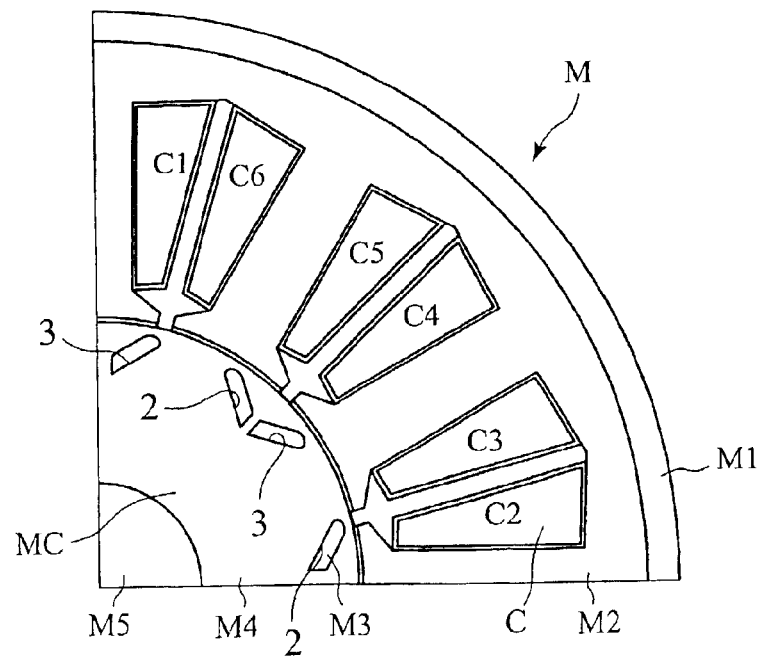
FIG. 15 is a schematic cross sectional view of a drive motor, of a fifth embodiment according to the present invention, to be suitably used in an electric vehicle.

FIG. 15 is a schematic cross sectional view of a drive motor M suitable for use in an electric vehicle. Also, in FIG. 15, the motor is shown only in a quarter of the cross section, with each of other quarters being formed in a similar structure.

In FIG. 15, the motor M is covered with a case M1, in which a stator M2 serving as a stationary part is disposed and a rotor M4 rotatable relative to the stator M2 is disposed in opposition thereto. Reference numeral M5 designates a rotatable shaft of the rotor M4, and the rotatable shaft M5 extends in a direction perpendicular to a plane of the sheet. The stator M2 has windings C, wound around in collective manner to be sequentially disposed in a circumferential direction of the stator M2. Also, among the windings C, the winding C1–C2 corresponds to a u-phase, the winding C3–C4 corresponds to a v-phase and the winding C5–C6 corresponds to a w-phase. The opening portions 2, 3 of the rotor M4 are embedded with respective permanent magnets M3, with the other areas of the rotor M4 other than the permanent magnets M3 forming a core MC.

With the structure described above, when three-phase alternating current flows through the windings C, rotating magnetic fields are created to cause the associated magnets M3 and the magnetic fields to mutually act to one another such that the rotor M4 is rotated and rotational output is taken out from the rotatable shaft M5 to be used as a drive power for the electric vehicle. Also, the motor M with such a structure is configured such that the stator M2 has 12 poles and the rotor M4 has 8 poles.

Next, the electric motor of the presently filed embodiment was actually fabricated and test was conducted with a result being described below.

EXAMPLE 6

In current Example, a plurality of sheets of electrical-steel-sheet formed bodies for the rotor core described with reference to Example 2 were stacked to form the rotor M4, and the motor with the structure shown in FIG. 15 was actually fabricated. When fabricating the motor, an outer diameter of the core of the rotor M4 was selected to be 140 mm, with a motor power output being targeted at a rating of 60 kW.

COMPARATIVE EXAMPLE 2

In current Comparative Example, a plurality of sheets of electrical-steel-sheet formed bodies for the rotor core fabricated in Comparative Example 1 were stacked to form a rotor, and a motor was actually fabricated as an electric motor. That is, the motor manufactured in current Comparative Example had the same structure as that of Example 6 except for the structure in which the rotor core was fabricated using the electrical-steel-sheet formed bodies, remaining as stamped (punched and blanked), with no hardened portions.

Here, as previously noted above, as a result of the rotation test for Comparative Example 1, since the test piece formed from the electrical-steel-sheet formed bodies remaining as stamped (punched and blanked) reaches the maximum rotation speed of 13000 rpm, it can be estimated that, in view of affording an allowance in an actual practice, the maximum rotation speed at which the motor of Comparative Example 2 can be available is 12000 rpm. Similarly, as a result of the rotation test for Example 2, since the test piece formed from the electrical-steel-sheet formed bodies formed with the hardened portions reaches the maximum rotation speed of 16000 rpm, it can be estimated that the maximum rotation speed at which the motor of Example 6 can be available is 15000 rpm.

Accordingly, a 25% increase in motor power output can be expected from the rotation test results for the test pieces formed from the electrical-steel-sheet formed bodies set forth above.

Evaluation of Motor

Evaluations were conducted for the motors fabricated in Example 6 and Comparative Example 2, respectively. As a result, it could be confirmed that, as expected, the motor of Example 6 was enabled to rotate at an increased rotation speed higher than that of Comparative Example 2. Also, the motor power output was improved to exceed the expected level.

Further, it was also found out that the motor had a more than 5% increase in a reluctance torque. This is because of the fact that the presence of the partially hardened areas of the rotor core conceivably resulted in an increase in difference between d-axis inductance and q-axis inductance.

Furthermore, upon comparison made between motor efficiencies for the motors rotating at 12000 rpm to provide the power output of 60 kW, the motor of Example 6 had a higher motor efficiency than that of the motor of Comparative Example 2. A principal factor for this is conceivably resulted from an increased torque.

Additionally, upon separate evaluations tried for motor losses, both iron loss and copper loss of the motor in Example 6 were slightly lower than those of the motor in Comparative Example 2. That is to say, although it can be evaluated that the slight increase occurred in the iron loss of the rotor core due to the presence of the hardened portions, it is conceived that an influence, which adversely affects on the motor loss due to such partially hardened areas, substantially remains at a small level.

From the foregoing results of studies conducted for the various embodiments, respective Examples and respective Comparative Examples, it can be understood that the motor is enabled to rotate at a further highly increased rotation speed due to the presence of the hardened portions at the outer-peripheral sides (the outer bridge portions) of the magnet-insertion opening portions and at the intervening area (the central bridge area) between the opening portions enables a sufficient function to be achieved in the electrical-steel-sheet formed body specified for the rotor core. Specifically, the presence of the hardened portions located in the outer bridge portions, which are partially hardened at the outer edge portions of the opening portions in limited areas not to expand to the outer circumferential periphery of the rotor core, and the presence of the hardened portions formed in the central bridge area at the opposing end portions of the opening portions so as to avoid the adjacent hardened portions from being connected to one another to allow a central area between the adjacent opposing end portions of the opening portions to have a non-hardened area.

Hereinafter, a description is given to other embodiments featuring further variety of hardened portions to be formed in rotor cores.

(Sixth embodiment)

Now, a sixth embodiment of the present invention is described below.

Figure 16:
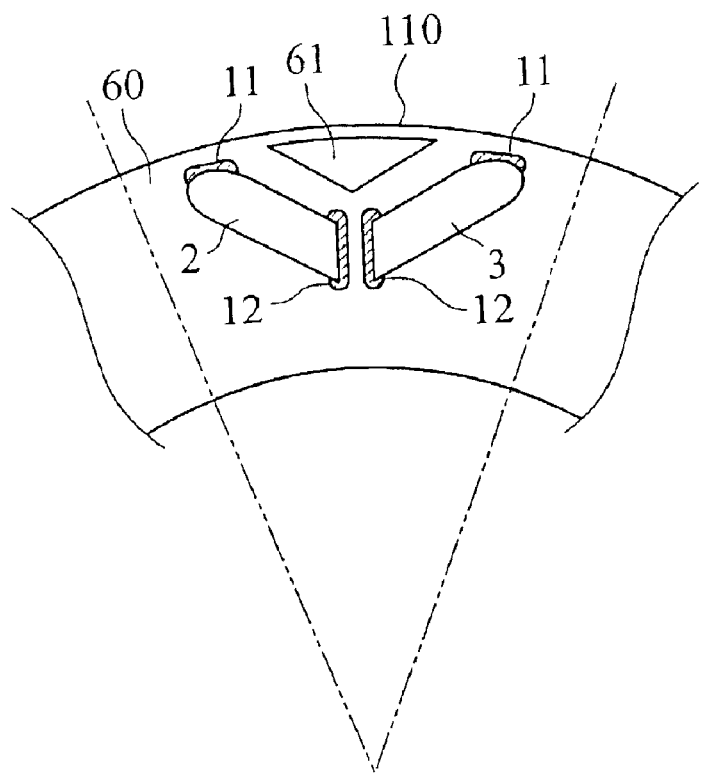
FIG. 16 is an enlarged view of a magnet-insertion opening portion of an electrical-steel-sheet formed body of a sixth embodiment according to the present invention.

FIG. 16 is an enlarged view illustrating magnet-insertion opening portions of an electrical-steel-sheet formed body for a rotor core of the presently filed embodiment.

The presently filed embodiment is directed to a configuration in which hardened portions are applied to a rotor (the electrical-steel-sheet formed body) having a penetrating window 61.

In the presently filed embodiment, also, the magnet-insertion opening portions 2, 3 of the electrical-steel-sheet formed body 60 for the rotor core have outer-peripheral hardened portions 11 partially formed at outer peripheries of the opening portions 2, 3, in a way similar to the first embodiment set forth above, and opening-opening hardened portions 12, formed at open ends of opposing opening portions 2, 3, which are disconnected to form a non-hardened area.

Thus, in case of the rotor core having the window portion 61, the presence of the partially hardened areas enables the rotor core to have sufficient strength to render the motor to rotate at an increased rotation speed.

(Seventh Embodiment)

Now, a seventh embodiment of the present invention is described below.

Figure 17:
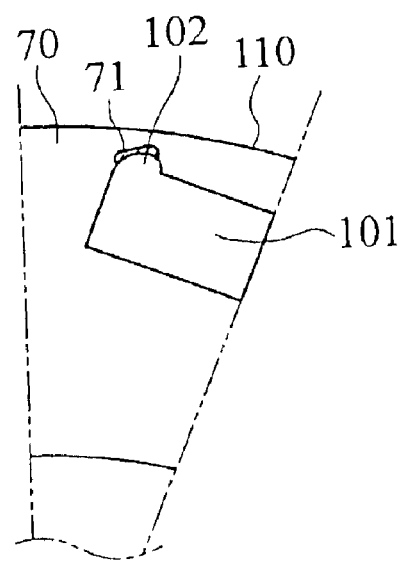
FIG. 17 is an enlarged view of a magnet-insertion opening portion of an electrical-steel-sheet formed body of a seventh embodiment according to the present invention.

FIG. 17 is an enlarged view illustrating magnet-insertion opening portions of an electrical-steel-sheet formed body for a rotor core of the presently filed embodiment.

The presently filed embodiment is directed to a configuration in which a hardened portion is applied to a rotor (electrical-steel-sheet formed body) having a circular arc space 102 (see FIG. 31), which expands toward an outer periphery of an electrical-steel-sheet formed body 70 for use as the rotor, formed at a corner of a magnet-insertion opening portion 101 formed in the electrical-steel-sheet formed body 70. Also, this rotor has a structure having one piece of permanent magnet for each pole.

In the presently filed embodiment, a partially hardened portion 71 is formed in the electrical-steel-sheet formed body 70 at an area closer to an outer periphery of the circular arc space 102 formed at the corner of the magnet-insertion opening portion 101. And, the hardened portion 71, which is partially hardened, is located in a limited region remote from an outer circumferential periphery 110 of the rotor.

Thus, in case of the rotor core having the circular arc space 102 formed at the corner of the magnet-insertion opening portion 101, the presence of the partially hardened area 71 enables the rotor core to have further increased strength to render the motor to rotate at a further higher rotation speed than that of the motor having the rotor merely employing the circular arc space.

(Eighth Embodiment)

Now, an eighth embodiment of the present invention is described below.

Figure 18:
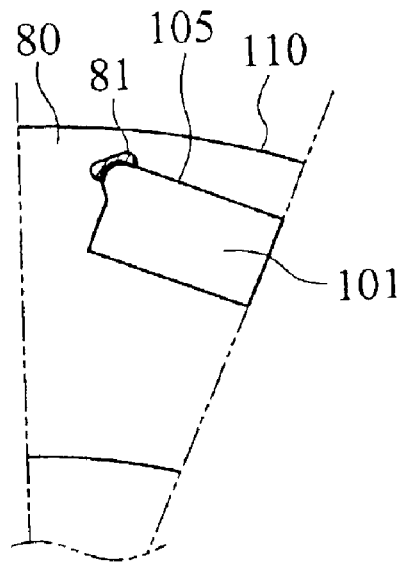
FIG. 18 is an enlarged view of a magnet-insertion opening portion of an electrical-steel-sheet formed body of an eighth embodiment according to the present invention.

FIG. 18 is an enlarged view illustrating magnet-insertion opening portions of an electrical-steel-sheet formed body for a rotor core of the presently filed embodiment.

The presently filed embodiment is directed to a configuration in which a hardened portion is applied to a rotor (electrical-steel-sheet formed body) having a circular arc space 105 (see FIG. 32), which expands along an extending direction of an opening portion, formed at a corner of a magnet-insertion opening portion 101 of an electrical-steel-sheet formed body 80 for a rotor core. Also, this rotor has a structure having one piece of permanent magnet for each pole.

In the presently filed embodiment, a partially hardened portion 81 is formed in the electrical-steel-sheet formed body 80 at an area closer to an outer periphery of the circular arc space 105 formed at the corner of the magnet-insertion opening portion 101. And, the hardened portion 81, which is partially hardened, is located in a limited region remote from an outer circumferential periphery 110 of the rotor.

Thus, in case of the rotor core having the circular arc space 105 formed at the corner of the magnet-insertion opening portion 101, the presence of the partially hardened area 81 enables the rotor core to have further increased strength to render the motor to rotate at a further higher rotation speed than that of the motor having the rotor merely employing the circular arc space.

(Ninth Embodiment)

Now, a ninth embodiment of the present invention is described below.

Figure 19:
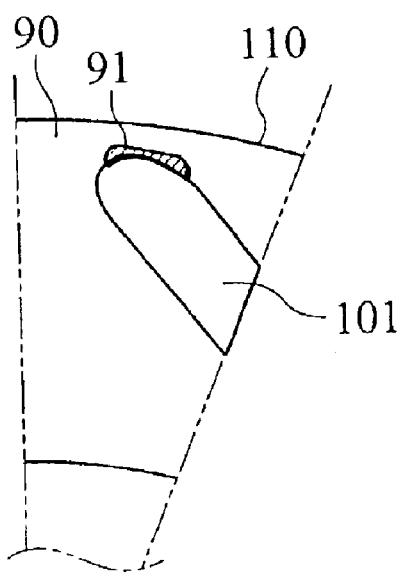
FIG. 19 is an enlarged view of a magnet-insertion opening portion of an electrical-steel-sheet formed body of a ninth embodiment according to the present invention.

FIG. 19 is an enlarged view illustrating magnet-insertion opening portions of an electrical-steel-sheet formed body for a rotor core of the presently filed embodiment.

The presently filed embodiment is directed to a configuration in which a hardened portion is applied to a rotor (electrical-steel-sheet formed body: see FIG. 30) having a V-shaped opening portion 101 serving as a magnet-insertion opening portion 101 of an electrical-steel-sheet formed body 90 for a rotor core. Also, this rotor has a structure having one piece of permanent magnet for each pole.

In the presently filed embodiment, a partially hardened portion 91 is formed in the electrical-steel-sheet formed body 90 at an opening end portion closer to an outermost periphery of the magnet-insertion opening portion 101 in such a way in which the hardened portion 91 is formed in a limited region remote from an outer circumferential periphery 110 of the rotor.

Thus, in case of the rotor core having the V-shaped opening portion 101, the presence of the partially hardened area 91 enables the rotor core to have further increased strength to render the motor to rotate at a higher rotation speed.

(Tenth Embodiment)

Now, another manufacturing method of an electrical-steel-sheet formed body of a tenth embodiment of the present invention.

First, a strength test of the electrical-steel-sheet formed body is described.

Figure 20:
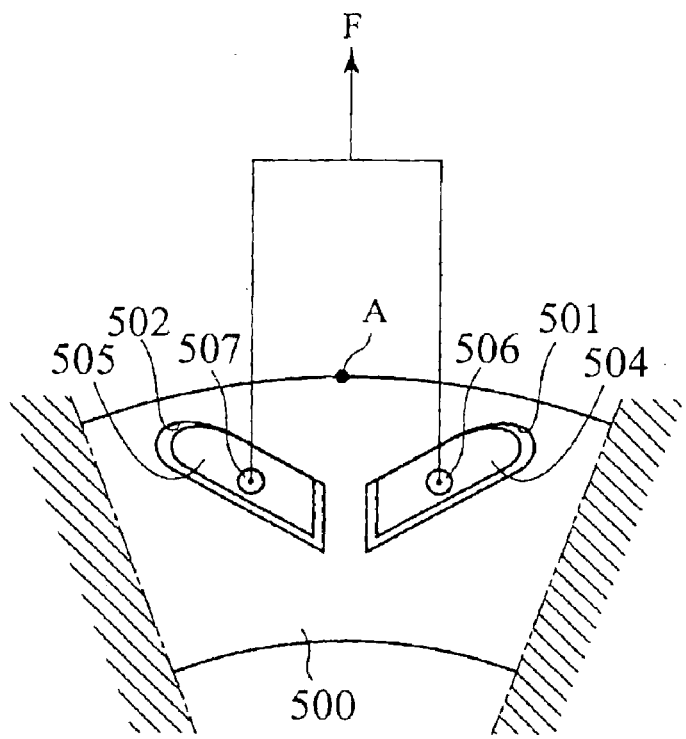
FIG. 20 is a graph illustrating a method of measuring the strength of a magnet bridge portion of an electrical-steel-sheet formed body of a tenth embodiment according to the present invention.

FIG. 20 is a graph illustrating a method of measuring the strength of a magnet bridge portion of the electrical-steel-sheet formed body of the presently filed embodiment.

When carrying out a strength measuring method, firstly, an outer bridge portion and a central bridge area of an electrical-steel-sheet formed body 500, forming a rotor, is cramped in a radial direction as shown in FIG. 20 at an area, corresponding to one pole (at an angle of 60 degrees), where there is no hardened portion. Also, one sheet of the electrical-steel-sheet formed body 500 is used as the rotor for this measurement.

And, magnet-insertion opening portions 501 and 502 are embedded with jigs 504 and 505, respectively, each formed in a magnet shape. Here, centers (at centers of gravity) of the jigs 504 and 505 have pin holes, respectively, through which pins 506 and 507 extend. Also, the jigs 504 and 505 are rotatable at an angle of suitable degrees and held in contact with outer sides, located outward in a radial direction of the rotor, of the magnet-insertion opening portions at only linear portions thereof, as shown in FIG. 20.

With such a structure, strength measurement was conducted by measuring the amount of a displacement D in an outer side periphery point A and an associated force (load) occurred when the pins 506 and 507 are tensioned in a direction as shown by F in the figure.

Figure 21:
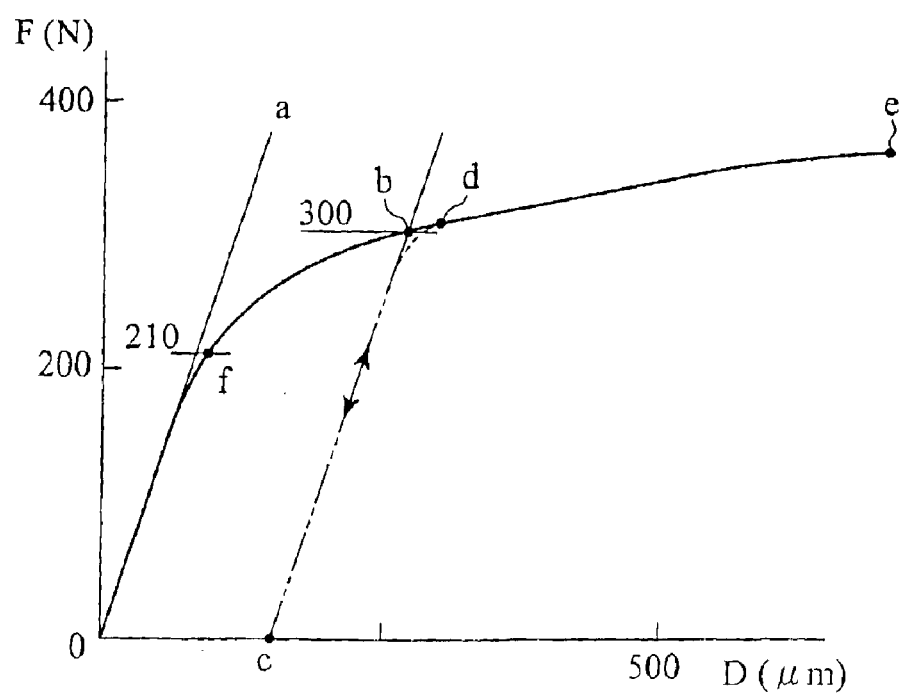
FIG. 21 is a graph illustrating the strength measured result of the electrical-steel-sheet formed body shown in FIG. 20 and shows a graph illustrating the relationship between a displacement D at a point A and a load F, in the tenth embodiment.

FIG. 21 is a graph showing a result of such strength measurement, and in the figure, the abscissa axis represents the amount D of the displacement at the point A while the ordinate axis represents the load F. Also, the electrical steel sheet (35H300 made by Nippon Steel Corporation) with a thickness of 0.35 mm was used as the rotor (the electrical-steel-sheet formed body).

As understood from FIG. 21, such a load curve linearly rises and, soon, the degree of inclination decreases such that the load curve is displaced from a linear line. This is because of the fact that a yield begins to occur in the rotor at a stress concentration point, that is, the plastic deformation occurs in the rotor. And, as the displacement increases in the rotor, the plastic deformation further proceeds in the rotor while being subject to work hardening. The load curve has a tendency in a similar relationship with a stress-strain curve.

By the way, as shown in FIG. 21, the force exerted to the rotor at a point (point f) displaced from the linear line a-O by 10 $\mu$m exhibits a value of 210N. Hereinafter, the force at which the displacement takes place in 10 $\mu$m is defined as a yield force (or strength). Then, the bridge strength of the electrical-steel-sheet formed body 501 used in the current test lies at 210N.

By the way, further explanation is described about what happens if the pulling is interrupted at a point b (F=300N) to cause the displacement to be reversed. Then, the load drops along a linear line b-c in FIG. 21. Also, the linear line b-c is parallel to a linear line a-O.

Next, if the displacement is oppositely tensioned again at a point c, the displacement takes place along the displacement-load curve c-d-e. The force exerted to the rotor during the displacement of 10 $\mu$m along the displacement-load curve c-d-e substantially lies at the load of 300N. That is, when pulling the rotor to the point b, a permanent deformation remains in a slightly limited range of O-c, and the rotor has the bridge strength of 300N.

It will thus be understood from the above-described evaluation result that preparing the electrical steel sheet, which is preliminarily stamped (punched and blanked) prior to the deformation, and deforming the same to provide a final shape enables the rotor (the electrical-steel-sheet formed body) to have increased strength.

Figure 22A:
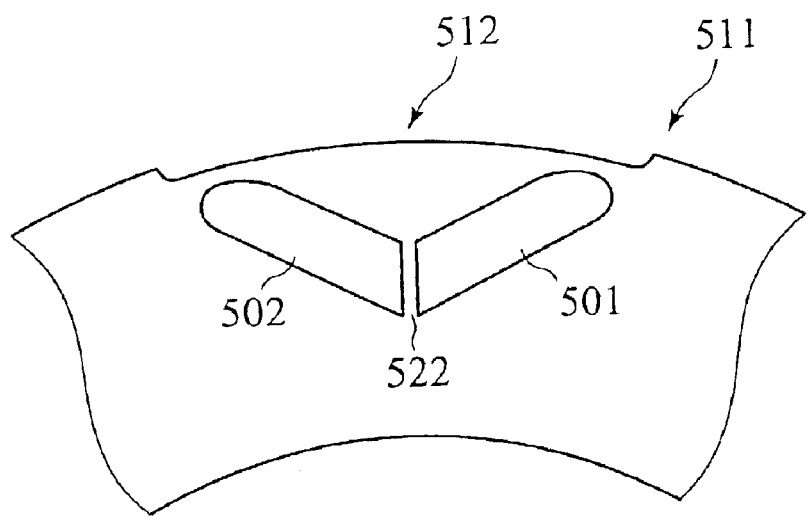
FIG. 22A is a view illustrating a manufacturing method for forming hardened portions by applying a plastic deformation in an electrical-steel-sheet formed body, in the tenth embodiment.
Figure 22B:
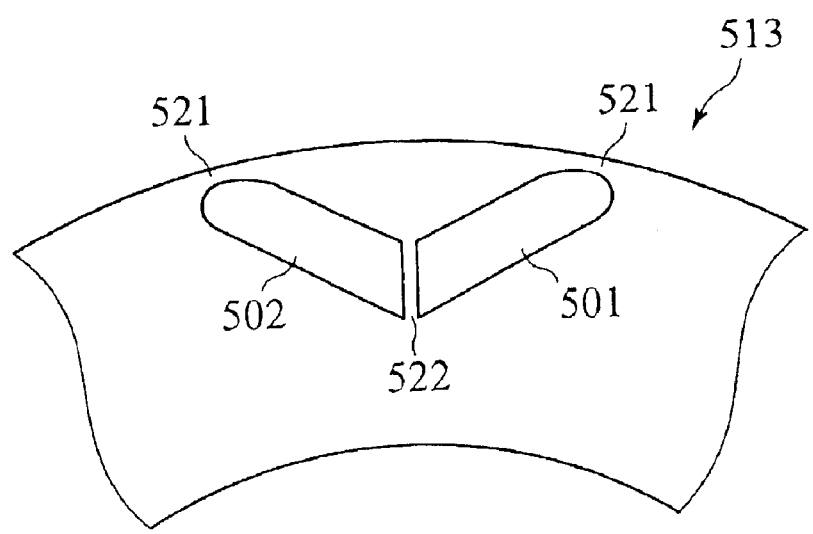
FIG. 22B is a view illustrating a step subsequent to a step shown in FIG. 22A, in the tenth embodiment.

FIGS. 22A and 22B are views for illustrating a method of forming hardening portions utilizing the plastic deformation applied to the electrical-steel-sheet formed body in consideration of the above view.

As shown in FIG. 22A, first, an electrical-steel-sheet formed body 511 is formed by die stamping (punching and blanking) in a way wherein the electrical-steel-sheet formed body, forming a rotor, has a concave-shaped portion 512, which is preliminarily formed to be slightly indented inward from an outer circumferential periphery of the body with a view to providing the amount of the deformation to allow the body to be subject to the plastic deformation, a central bridge portion 522, which is slightly smaller than that in a final shape, and opening portions 501 and 502 each of which is slightly small.

Next, two sets of jigs 504 and 505, which are shown in FIG. 20, are prepared and inserted through the opening portions 501 and 502 serving as magnet-insertion bores (bores adapted to insert magnets for two poles with respect to a center of the rotor) located in an upper and lower area. When this takes place, the jigs 504 and 505 are held in contact with the opening portions at respective linear portions of outer diameter sides thereof in a radial direction of the rotor in a manner as shown in FIG. 20.

Subsequently, under such a condition, the jigs 504 and 505 are pulled in a radial direction (in a vertical direction in the figure) of the rotor. Namely, the rotor is pulled by using the two sets of jigs 504 and 505, that is, by using a set of opening portions 501 and 502, for the two poles, oppositely located with respect to the center of the rotor. When this takes place, the load exerted to the rotor lies at the same level as that described in conjunction with FIG. 20 and the amount of the displacement becomes two times the displacement of the rotor shown in FIG. 20. This is because that, in a case shown in FIG. 20, since the rotor per se is cramped, the origin of the displacement lies at the center of the rotor whereas, in a case where the two sets of jigs are inserted through the oppositely disposed magnet bores for the two poles to cause the rotor to be pulled from both sides, since the origin of the displacement lies at one of the jigs, the presence of the same force being imparted to the rotor causes the rotor to be displaced two times. And, the deformation is interrupted at the load of 300N, and the load is removed.

Figure 23:
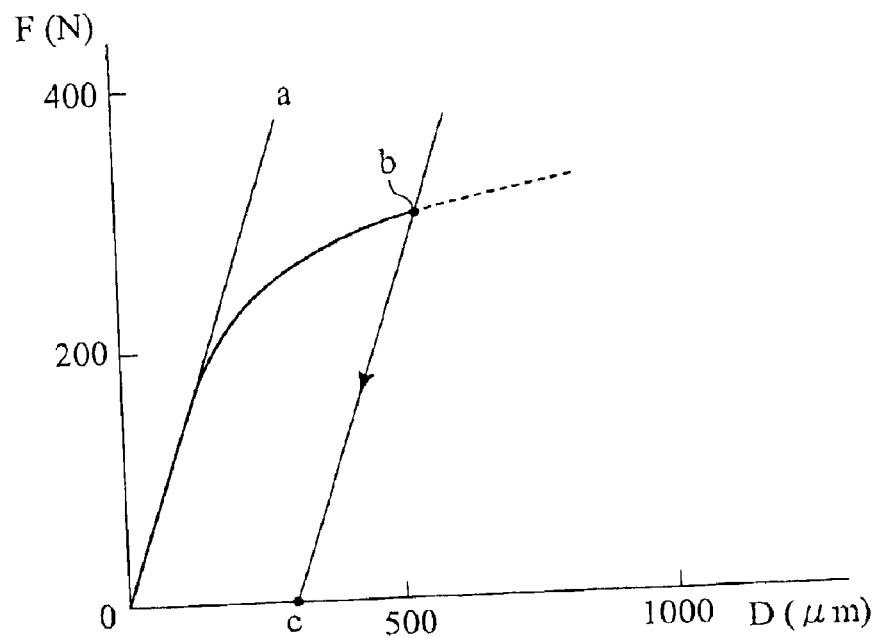
FIG. 23 is a graph illustrating the relationship between a displacement D at the point A and a load F in the electrical-steel-sheet formed body in which hardened portions are formed by a plastic deformation, in the tenth embodiment.

FIG. 23 is a graph showing the displacement-load curve obtained in the above structure. However, the displacement in the abscissa axis in FIG. 23 is expressed in a level two times that of FIG. 21.

As shown in FIG. 23, in such a case, the plastic deformation in a length O-c remains in the rotor.

Subsequently, thereafter, the above-described deforming operations are carried out two times (in total of three times).

Upon steps set forth above, as shown in FIG. 22B, the presence of the deformation in the electrical steel sheet caused in the outer circumferential direction enables the concave-shaped portion to disappear to allow the rotor to entirely have a circular outer circumferential periphery such that the central bridge portion 522 is slightly narrowed to a smaller value than the initial shape and the opening portions 501 and 502 take the form of proper shapes to form an electrical-steel-sheet formed body 513.

Since the work hardened area obtained by the plastic deformation set forth above can be strengthened at the most desired particular portion where strengthening by work hardening is required, it is extremely convenient to perform work hardening. Also, it is extremely convenient in that the area to be plastic deformed lies in a position that is originally weak from the point of mechanical strength, that is, in a case of the shape shown in FIG. 22B, the weak portions reside in the outer bridge portions 521 and the central bridge portion 522 with no deformation being applied to the other portions.

Figure 24:
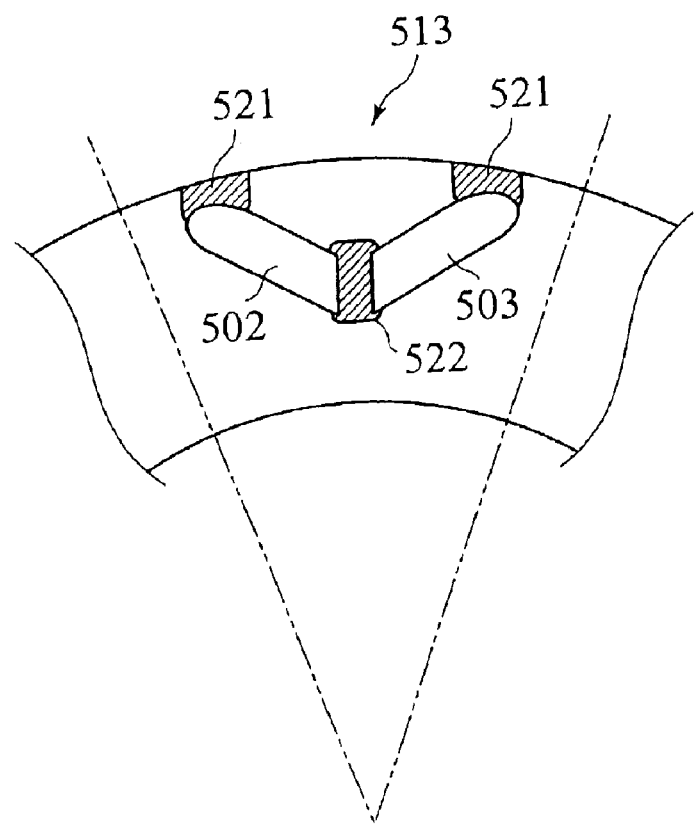
FIG. 24 is a view illustrating areas to be plastic deformed in the electrical-steel-sheet formed body, in the tenth embodiment.

FIG. 24 is a view illustrating a rotor formed from an electrical-steel-sheet formed body whose areas to be plastic deformed are indicated by hatched portions in oblique line.

In FIG. 24, work hardening is not implemented throughout an entire region of a plastic working area in a uniform manner, and work hardening is implemented around stress concentration portions near magnet-insertion bores. That is, the closer the region to be work hardened to the magnet-insertion bore, the larger will be the buildup in strength to be provided by work hardening.

Although almost no variation occurs in a thickness of the electrical-steel-sheet formed body 513 prepared in such a manner as set forth above, the plastic deformed areas, that is, the outer bridge portions 521 and the central bridge portion 522 are slightly thinned. Also, when the deformation takes place, no variation occurs in thickness at the linear portions, held in contact with the jigs, of the outer sides, in the radial direction, of the opening portions 501 and 502 serving as the magnet-insertion bores. Consequently, when forming the rotor using a stack of the electrical-steel-sheet formed bodies as set forth above, the rotor can be manufactured in the same stacked ratio as that of the rotor formed by stacking the stamped (punched and blanked) steel sheets.

Also, as already discussed hereinabove, the areas subjected to plastic working shown in FIG. 24 form the regions that do not adversely affect the motor performance.

By the way, to explain the actual amount of the displacement in more detail, in a case where, at the point A in FIG. 20, the electrical-steel-sheet formed body has a radius of curvature of 50 mm, if the pulling force exerted to the rotor at 300N is interrupted, then the displacement of 150 $\mu$m remains at the point A in FIG. 20 (see FIG. 21). Consequently, the amount of the displacement (amount of deformation) in a macrostructure can be expressed by a rate of an amount of a displacement with respect to an overall length as indicated in a formula 0.15/50×100=0.3(%).

On the other hand, the displacement at the point A can be realized to the extent falling in a value ranging from 25 $\mu$m and 750 $\mu$m. This is because of the fact that, if the displacement at the point A is less than 25 $\mu$m, then as will be understood from FIG. 21, the margin in which strength is increased becomes small and, so, the application of a specific plastic deformation becomes meaningless. On the contrary, if the displacement is greater than 750 $\mu$m, it becomes undesirable because the rotor suffers from various adverse affects of the increased deformation of the electrical-steel-sheet formed body such as the occurrence of the warping in the sheet, and the stack of the electrical-steel-sheet formed bodies has the inability to obtain the desired stacked ratio.

Further, it is conceived that, while the amount of the displacement (deformation) in a macrostructure remains in a small numeric value, in consideration of a local sense, a displacement (deformation) in a microstructure has an amount larger than the amount of displacement in the macrostructure approximately by one order of magnitude. Then, although it seems that an insulation film of the electrical steel sheet can resist to the deformation in a degree of approximately 10%, the presence of a larger degree of the deformation occurred in the steel sheet causes a danger of deterioration in a function of the insulation film. Consequently, also, in view of the function of the insulation film, an upper limit of the amount of the deformation, in terms of the microstructure, in which the manufacturing method of the presently filed embodiment can be applied, may reasonably fall in a range equal to or less than 750 $\mu$m. Also, from the same reason, the amount of the deformation in terms of the macrostructure may preferably fall in a range equal to or greater than 0.05% and equal to or less than 1.5% and, more preferably, the amount of the deformation may fall in a value ranging from 50 $\mu$m to 500 $\mu$m in terms of the macrostructure while the amount of the deformation may fall in a value ranging from 0.1% to 1% in terms of the macrostructure. This is because of the fact that, if the amount of the deformation is less than 50 $\mu$m or 0.1%, then a difficulty is encountered in increasing strength whereas, in contrast, if the deformation is caused at a rate greater than 500 $\mu$m or 1% remaining in allowable ranges, then the excessive deformation, such as the warping of the steel sheet, appears and, therefore, it is desirable for the amount of the deformation to lie in the range of approximately 500 $\mu$m or 1%.

EXAMPLE 7

Next, as Example 7, the plastic deformation was applied to the electrical steel sheet at 300N using the manufacturing method according to the tenth embodiment, thereby fabricating a single rotor plate that formed the electrical-steel-sheet formed body. That is, such an electrical-steel-sheet formed body was first stamped (punched and blanked) in the shape shown in FIG. 22A and, subsequently, the plastic deformation step was applied to the resulting formed body to obtain the final shape with a diameter of 100 mm as shown in FIG. 22B. And, the rotation test was conducted in a manner described below using such a resulting electrical-steel-sheet formed body.

COMPARATIVE EXAMPLE 3

Next, as Comparative Example 3, the electrical steel sheet was treated in the same way as that of Example 7 except for no plastic deformation step being carried out. That is, the electrical steel sheet was merely stamped (punched and blanked) into the same final shape as that of Example 7 to fabricate a single rotor plate forming an electrical-steel-sheet formed body. Namely, the resulting electrical-steel-sheet formed body was formed just by stamping (punching and blanking) the steel sheet into the final shape with a diameter of 100 mm as shown in FIG. 22B. And, by using such a resulting electrical-steel-sheet formed body, the rotation test was conducted in the same manner as that of Example 7.

Rotation Test

Rotation test were carried out for the test pieces obtained in Example 7 and Comparative Example 3 set forth above.

The current tests were conducted using the rotation test apparatus shown in FIG. 7.

Figure 25A:
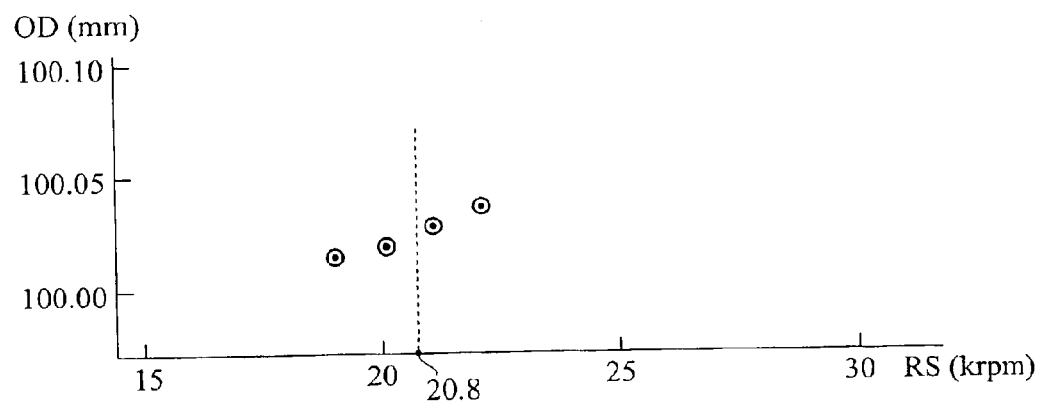
FIG. 25A is a graph illustrating a result of the rotation test of a single rotor plate using an electrical-steel-sheet formed body that is only stamped in a final shape as Comparative Example 3, in the tenth embodiment.
Figure 25B:
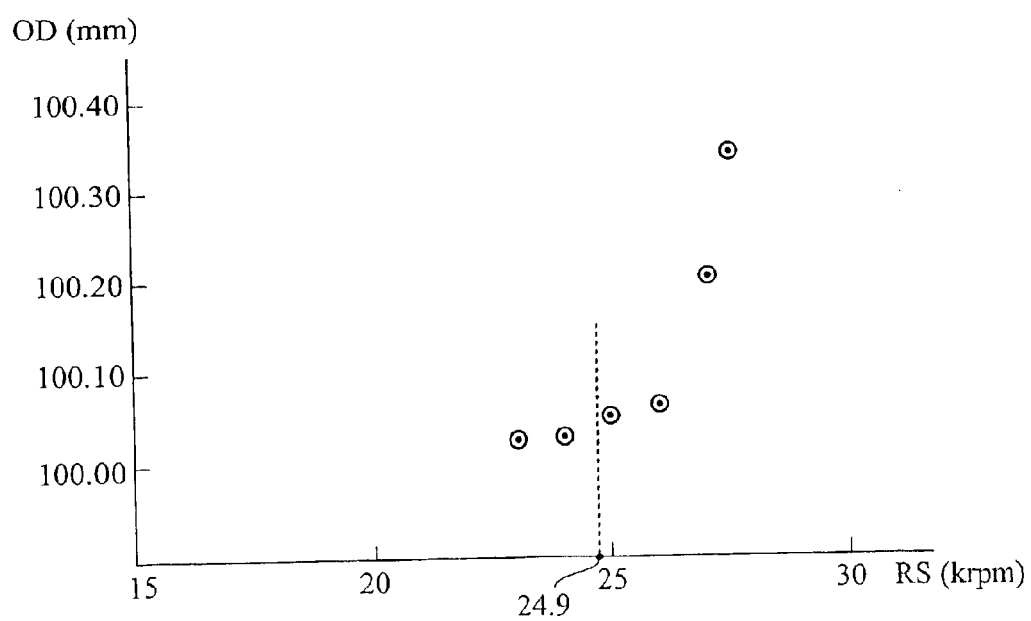
FIG. 25B is a graph illustrating a result of the rotation test of a single rotor plate using an electrical-steel-sheet formed body that is fabricated as Example 7 upon a plastic deformation, in the tenth embodiment.

FIGS. 25A and 25B are views illustrating results of the rotation tests, and, in the figures, the abscissa axis represents a rotation speed RS while the ordinate axis represents an outer diameter OD of the rotor. FIG. 25A shows the test result of the resulting electrical-steel-sheet formed body obtained in Comparative Example 3, and FIG. 25B shows the test result of the resulting electrical-steel-sheet formed body prepared by applying the plastic deformation at 300N in Example 7.

As previously described above, the rotation test for the single rotor plate enables resistance of the rotor to the centrifugal force to be checked.

The rotation test was conducted for checking resistance-to-centrifugal-force under a condition in that magnet-insertion opening portions of the resulting electrical-steel-sheet formed body are fitted with dummy magnets with a thickness of 0.35 mm in the same thickness as that of the resulting electrical-steel-sheet formed body. In particular, such rotation tests were conducted first by rotating the spindle at a given rotation speed for one minute and interrupting the rotation once for a while to measure an outer diameter of the electrical-steel-sheet formed body. Then, the rotation speed of the spindle was increased in a similar manner whereupon rotation of the spindle was interrupted and the outer diameter was measured. And, repeating such works enables the amount of the deformation of the electrical-steel-sheet formed body to be checked.

First, the test result of the electrical-steel-sheet formed body, as remained in the stamped (punched and blanked) state, of Comparative Example 3 is described below with reference to FIG. 25A. An initial start rotation speed was set at 19 krpm and, at this rotation speed, no deformation occurred in the outer diameter. At a subsequent rotation speed of 20 krpm, a slight amount of the deformation occurred. Also, in this figure, the amount of the outer diameter OD is plotted on the ordinate axis in a value 2.5 times greater than that of FIG. 25B.

Subsequently, the test result of the electrical-steel-sheet formed body, which is plastically deformed, of Example 7 is described below with reference to FIG. 25B. The initial start rotation speed was set at 23 krpm for measurement and, at this rotation speed, no deformation occurs in the outer diameter. At a subsequent rotation speed of 24 krpm, no deformation occurred in the outer diameter. And, at the rotation speed of 25 krpm, approximately 25 $\mu$m increase occurred in the outer diameter. At a further increased rotation speed, the outer diameter increases in an exponential function. If the rotation speed that causes the outer diameter to be deformed by 20 $\mu$m is defined as a usable limit rotation speed, then the usable limit rotation speed of the electrical-steel-sheet formed body is expressed at 24.9 krpm.

From these results, it appears that the electrical-steel-sheet formed body manufactured by the manufacturing method of the tenth embodiment has a higher value in the usable limit rotation speed than that of the electrical-steel-sheet formed body that remains as stamped (punched and blanked).

By the way, comparison is made between an inclination in a tangential line at the point b of the displacement load curve and an inclination of a tangential line at the point f in FIG. 21.

Then, the inclination at the point f has a value 1.82 times greater than that of the point b. That is to say, it is concluded that, among the amounts of the plastic deformation occurred when excessively exerted with the load at the same rate at the points f and b, the amount of the deformation at the point f has a value of 1/1.82. Accordingly, although in the foregoing description, the usable limit rotation speed is defined to be the rotation speed at which the outer diameter is increased by 20 $\mu$m, the amount of the deformation in the electrical-steel-sheet formed body that remains as stamped (punched and blanked) should be preferably in a value of 1/1.82. That is, it is concluded that the usable limit rotation speed should be the rotation speed at which the outer diameter increases by a value of 11 $\mu$m. In such a manner, the usable limit rotation speed may be estimated to fall in a value of 20.8 krpm.

On the other hand, the usable limit rotation speed at 300N and the usable limit rotation speed at 210N can be analytically predicted. Also, such analytically predicted values coincided with the above values obtained by the experimental tests.

Namely, the stress distribution appearing when rotated at 20 krpm is obtained in an elastic FEM analysis. Next, the stress distribution appearing when tensioned as shown in FIG. 20 is obtained in the elastic FEM analysis. Here, the stress distribution in the rotating state and the stress distribution in the tensioned state remain in resemblance. Consequently, from these stress distributions, it is possible to check the tension load to achieve the stress at the stress concentration portion in the rotating state. Namely, since the rotation speed is proportional to the square of the centrifugal force, the usable limit rotation speed can be predicted from the square root of the ratio of the tension load. In particular, the usable limit rotation speed with respect to the value of 210N lied at 20.8 krpm, and the usable limit rotation speed with respect to the value of 300N lied at 24.9 krpm. That is, the value of square root of 210N/300N is equal to the value of 20.8 krpm/24.9 krpm.

As set forth above, according to the structure of the presently filed embodiment, implementing plastic deforming step on the electrical steel sheet enables the resulting rotor to have an approximately 20% increase in the usable limit rotation speed.

Also, while, in the presently filed embodiment, plastic deforming steps are carried out three times for one direction, the present invention is not limited to a particular number of times in which such plastic deformation steps are carried out and may take various alterations such that the plastic deformation steps may be simultaneously carried out in three directions. Also, another alternative may include step of stamping (punching and blanking) the electrical steel sheet combined with the plastic deformation step. Also, as another alternative, the plastic deformation step may be carried out under a condition in which a plurality of sheets of electrical steel sheets are stacked and, in this case, since the load to be exerted is not so very large, such a fabrication step is more efficient.

Further, the manufacturing method including the plastic deformation step similar to the presently filed embodiment may be applied to the electrical steel sheets in various shapes.

Figure 26:
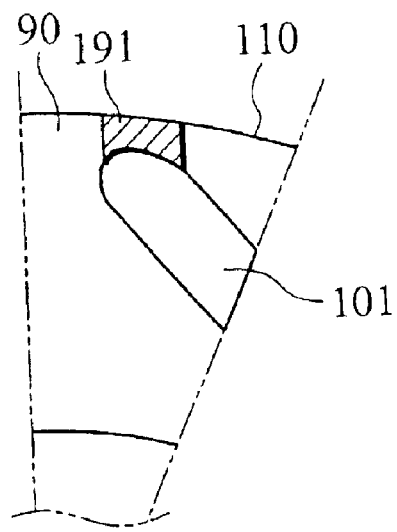
FIG. 26 is a view illustrating an area of the electrical-steel-sheet formed body, to be plastic deformed in another shape, in the tenth embodiment.
Figure 30:
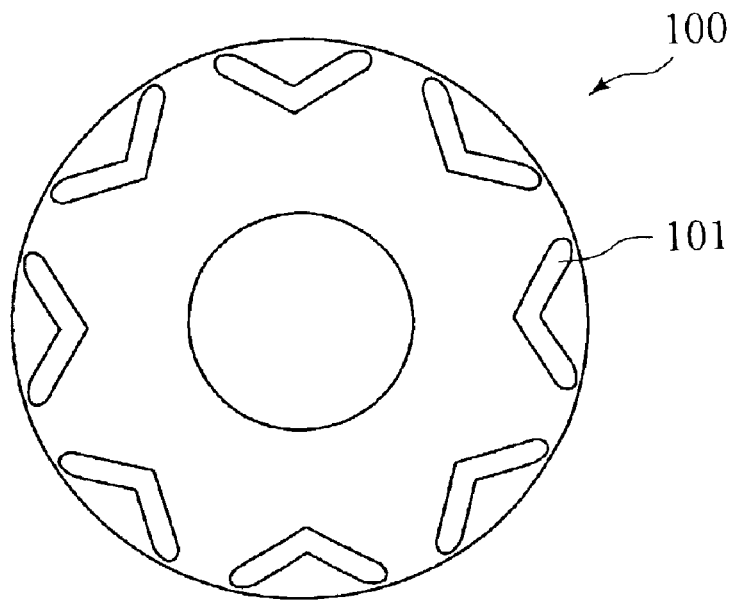
FIG. 30 is a view illustrating a rotor of another related art built-in permanent magnet type synchronous motor.

Namely, the electrical-steel-sheet formed body having the magnet-insertion openings as shown in FIG. 30 may be formed with the hardened portions 191 at the outer bridge portions in the same plastic deformation step set forth in conjunction with the presently filed embodiment as shown in FIG. 26. In this case, in compliance with the above-described predicting method, when applied with the deformation at 0.3%, it is predicted that an approximately 20% increase results in the usable limit rotation speed.

Figure 27:
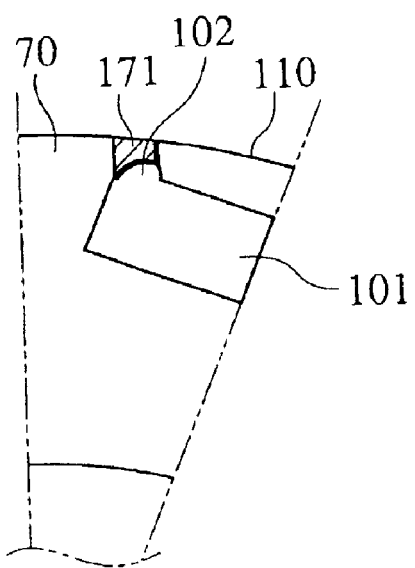
FIG. 27 is a view illustrating an area of the electrical-steel-sheet formed body, to be plastic deformed in still another shape, in the tenth embodiment.
Figure 31:
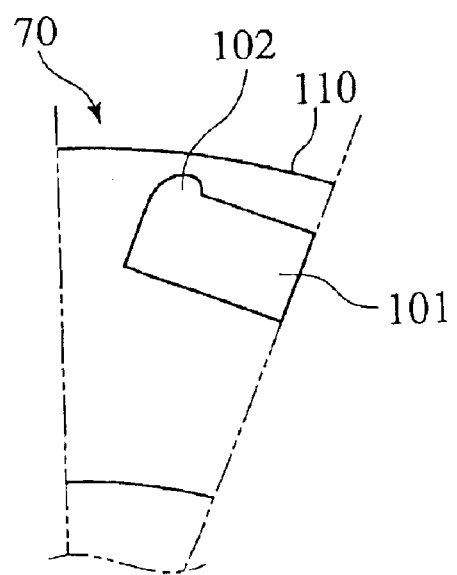
FIG. 31 is an enlarged view of a magnet-insertion opening of a related art rotor.

Further, the electrical-steel-sheet formed body having the magnet-insertion openings as shown in FIG. 31 may be formed with the hardened portions 171 at the outer bridge portions in the same plastic deformation step set forth in conjunction with the presently filed embodiment as shown in FIG. 27. In this case, in compliance with the above-described predicting method, when applied with the deformation at 0.3%, it is predicted that an approximately 20% increase results in the usable limit rotation speed.

Figure 28:
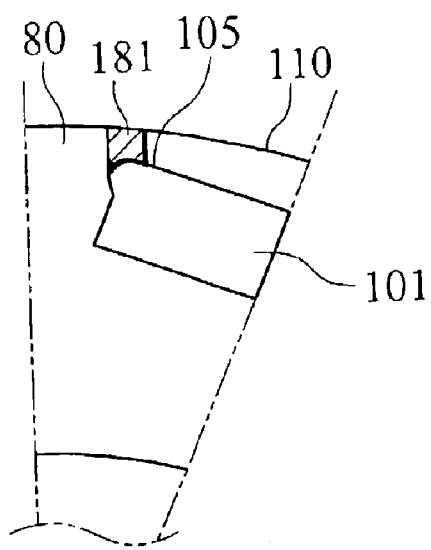
FIG. 28 is a view illustrating an area of the electrical-steel-sheet formed body, to be plastic deformed in still another shape, in the tenth embodiment.
Figure 29:
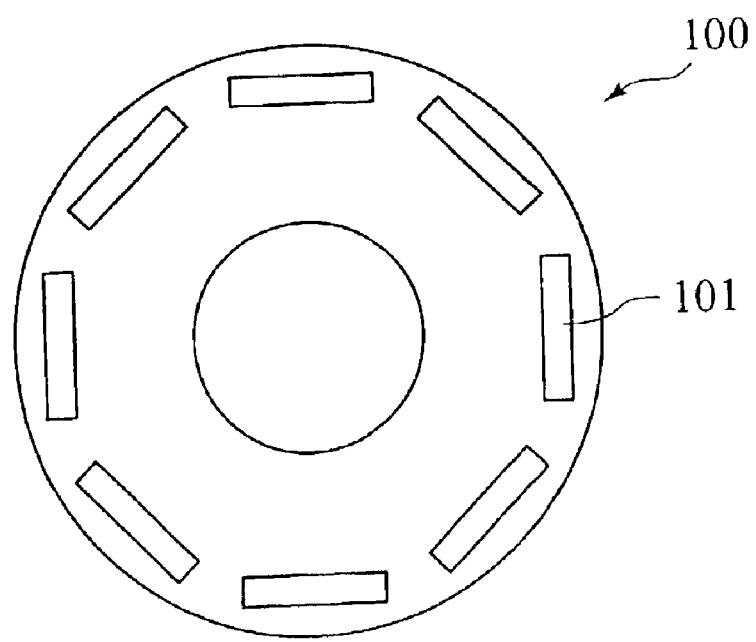
FIG. 29 is a view illustrating a rotor of a related art built-in permanent magnet type synchronous motor.
Figure 32:
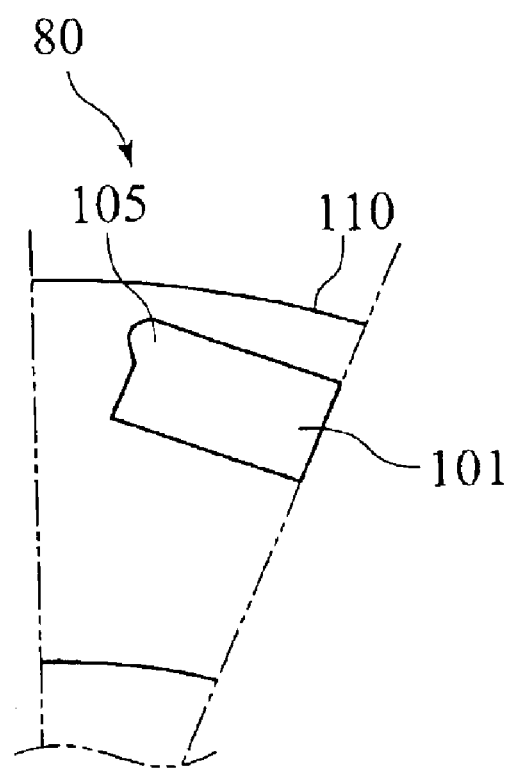
FIG. 32 is an enlarged view of a magnet-insertion opening of another related art rotor.

Furthermore, the electrical-steel-sheet formed body having the magnet-insertion openings as shown in FIG. 32 may be formed with the hardened portions 181 at the outer bridge portions in the same plastic deformation step set forth in the presently filed embodiment as shown in FIG. 28. In this case, in view of the above-described experimental tests, when applied with the deformation at 0.3%, it is similarly predicted that an approximately 20% increase results in the usable limit rotation speed.

As previously noted above, the manufacturing method of the presently filed embodiment can be applied to the electrical steel sheets in various shapes and the motor can be rotated at an increased speed using the electrical steel sheet made from a base substance with low strength and low iron loss.

(Eleventh Embodiment)

In the presently filed embodiment, a motor was manufactured as an electric motor using the electrical-steel-sheet formed body for the rotor core, specifically and typically, in Example 7 of the tenth embodiment among other presently filed embodiments described above. Also, such a motor may serve as an electric power generator if not used in a drive power generation mode but used in an electric power generation mode.

Namely, the motor in the presently filed embodiment was the one that was manufactured in the same way as that of the fifth embodiment except for that the rotor M4 was formed by stacking a plurality of sheets of the electrical-steel-sheet formed bodies for the rotor core described in Example 7 of the tenth embodiment.

Next, the motor in the presently filed embodiment was actually fabricated and the test was conducted with a result being described below.

EXAMPLE 8

In the presently filed embodiment, the rotor M4 was formed by stacking a plurality of sheets of the electrical-steel-sheet formed bodies for the rotor core described in Example 7 and the motor with a structure shown in FIG. 15 was actually manufactured. In this case, the core diameter of the rotor M4 was selected to be 100 mm, with a motor power output being targeted at the rating of 60 kW.

COMPARATIVE EXAMPLE 4

In current Comparative Example, a plurality of sheets of electrical-steel-sheet formed bodies for the rotor core fabricated in Comparative Example 3 were stacked to form a rotor, and a motor was actually fabricated as an electric motor. That is, the motor manufactured in current Comparative Example had the same structure as that of Example 8 except for the structure in which the rotor core was fabricated using the electrical-steel-sheet formed bodies, remaining as stamped (punched and blanked), with no hardened portions.

Upon comparison made between motor efficiencies for the motors, of Example 8 and Comparative Example 4, rotating at 18000 rpm and at the power output of 60 kW, the motor, using the rotor composed of the plurality of stacked sheets of the electrical-steel-sheet formed bodies, of Example 8 had a higher motor efficiency than that of the motor, using the rotor composed of the plurality of stacked sheets of the electrical-steel-sheet formed bodies as remained stamped (punched and blanked), of Comparative Example 4. A principal factor for this is conceivably resulted from an increased torque. Also, an increase in iron loss of the rotor core caused by the plastic deformation is estimated to lie in a small value.

Further, no reduction in strength of the rotor was recognized which resulted from the temperature (thermal insert temperature and curing temperature of magnet adhesive), experienced in manufacturing stages of such rotor, and the operating temperature of the motor. That is, it is concluded that no deterioration occurs in the work hardening results at those temperatures.

Furthermore, since the presence of the amount (in terms of macrostructure set forth above) of the plastic deformation lying in a range equal to or greater 0.05% and equal to or less than 1.5% as described above still provides an allowance in the elongation of the electrical-steel-sheet formed body, there is no adverse affect on a reliability and a durability.

Additionally, among the various embodiments described above, typically, when forming the hardened portions, while the laser peening related to the first to third embodiments has been described as applied to the single sheet of electrical-steel-sheet formed body, the laser peening may be applied to the rotor core formed in the stacked condition to partially form the hardened portions thereon. Also, typically, while the compressing work related to the fourth embodiment has been exemplarily expressed as applied to the single sheet of electrical-steel-sheet formed body, the compressing work may also be applied to a plurality of electrical-steel-sheet formed bodies under a stacked state thereof.

Further, the method of performing work hardening may include, in addition to the laser peening, a shot peening technology. Also, plastic work treatment such as a roller vanishing technique may be used and, in addition, the hardened portions may be formed using a composition-strengthening method such as a laser remelt technique and a laser alloying technique.

Moreover, the above tenth embodiment has been described in conjunction with the example wherein the electrical steel sheet has a thickness of 0.35 mm, the present invention, involving the other embodiments, is not limited to a particular thickness of the electrical steel sheet and may preferably employ the electrical steel sheets with other thickness such as 0.35 mm or 0.2 0 mm.

Furthermore, it is useless to say that the rotor may have, in addition to the circular shape that is exemplarily shown, other shapes and, particularly, in addition to the rotor formed with one or two magnet-insertion openings for each pole, the rotor may further have a plurality of opening portions to allow a plurality of associated magnets to be inserted therein for each pole.

Moreover, the principal concept of the present invention may be suitably applied not only to the motor or the electric power generator but also to other rotary electric machines.

The entire content of a Patent Application No. TOKUGAN 2002-124320 with a filing date of Apr. 25, 2002 in Japan and the entire content of a Patent Application No. TOKUGAN 2002-349943 with a filing date of Dec. 2, 2002 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An electrical-steel-sheet formed body for use in forming a rotor core of a built-in permanent magnet type rotary electric machine, comprising:
    an opening portion into which a permanent magnet is inserted; and
    an outer-peripheral hardened portion formed on the electrical-steel-sheet formed body at an outer periphery side of the opening portion and having a higher hardness than a remaining area of the electrical-steel-sheet formed body.

2. The electrical-steel-sheet formed body according to claim 1, wherein the outer-peripheral hardened portion is formed in a range extending from an outer-peripheral edge of the opening portion toward a location away from an outer periphery of the electrical-steel-sheet formed body corresponding to an outer periphery of a rotor.

3. The electrical-steel-sheet formed body according to claim 2, wherein the outer-peripheral hardened portion has a first width l with respect to a first bridge width L between the outer-peripheral edge of the opening portion and the outer periphery of the electrical-steel-sheet formed body, the first width l being shown as follows:

$$\tfrac{1}{6} \cdot L \leq l \leq \tfrac{1}{2} \cdot L.$$

4. The electrical-steel-sheet formed body according to claim 1, wherein a plurality of opening portions are provided for each pole, the permanent magnet is inserted into each of the plurality of opening portions, and a second opening hardened portion is formed between the plurality of opening portions and has a higher hardness than the remaining area of the electrical-steel-sheet formed body.

5. The electrical-steel-sheet formed body according to claim 4, wherein the second openings hardened portion is formed at an outer-peripheral edge region of the plurality of opening portions, with the second opening hardened portion in the outer-peripheral edge region of one of the plurality of opening portions being separated from the second opening hardened portion in the outer-peripheral edge region of the other of the plurality of opening portions to form a non-hardened portion therebetween.

6. The electrical-steel-sheet formed body according to claim 5, the second opening hardened portion has a second width l' with respect to a second bridge width L' between the outer-peripheral edge of the one of the plurality of opening portions and the outer-peripheral edge of the other of the plurality of opening portions, the second width l' being shown as follows:

$$\tfrac{1}{6}\cdot L' \leq l' \leq \tfrac{1}{3}\cdot L.$$

7. The electrical-steel-sheet formed body according to claim 4, wherein the second opening hardened portion has the maximum Vickers hardness value $\geq 1.3\times$ and $\leq 2.5\times$ greater than the remaining area of the electrical-steel-sheet formed body.

8. The electrical-steel-sheet formed body according to claim 4, wherein a total sum of the outer-peripheral hardened portion and the second opening hardened portion is $\geq 1\%$ and $\leq 20\%$ of an entire surface area of the electrical-steel-sheet formed body.

9. The electrical-steel-sheet formed body according to claim 1, wherein the outer-peripheral hardened portion has the maximum Vickers hardness value $\geq 1.3\times$ and $\leq 2.5\times$ greater than the remaining area of the electrical-steel-sheet formed body.

10. A rotor for a built-in permanent magnet type rotary electric machine, the rotor comprising:
   a permanent magnet; and
      an electrical-steel-sheet formed body having an opening portion for insertion of the permanent magnet and including an outer-peripheral hardened portion formed in the electrical-steel-sheet formed body at an outer periphery side thereof and which has a higher hardness than a remaining area of the electrical-steel-sheet formed body.

11. A built-in permanent magnet type rotary electric machine, comprising:
   a stator;
      a winding disposed in the stator; and
   a rotor disposed in opposition to the stator, the rotor being provided with:
      a permanent magnet; and
      an electrical-steel-sheet formed body having an opening portion for insertion of the permanent magnet and including an outer-peripheral hardened portion formed in the electrical-steel-sheet formed body at an outer periphery side thereof and which has a higher hardness than a remaining area of the electrical-steel-sheet formed body.

12. A method of manufacturing an electrical-steel-sheet formed body for use in forming a rotor core of a built-in permanent magnet type rotary electric machine, the method comprising:

preparing an electrical steel sheet;
   forming an opening portion in the electrical steel sheet for insertion of a permanent magnet therein;
   forming a contoured shape of the electrical steel sheet corresponding to a contoured shape of a rotor; and
   forming an outer-peripheral hardened portion on the electrical-steel-sheet formed body having a higher hardness than a remaining area of the electrical steel sheet by applying an external action thereto such that the outer-peripheral hardened portion is located at an outer periphery side of the electrical steel sheet.

13. The method of manufacturing an electrical-steel-sheet formed body according to claim 12, wherein the outer-peripheral hardened portion is formed by work hardening prior to forming the opening portion and the contoured shape of the rotor.

14. The method of manufacturing an electrical-steel-sheet formed body according to claim 12, wherein the outer-peripheral hardened portion is formed, after forming the opening portion, by carrying out work hardening on the area at an end portion of the opening portion.

15. The method of manufacturing an electrical-steel-sheet formed body according to claim 12, wherein a plurality of opening portions are provided for each pole such that the permanent magnet is inserted into each of the plurality of opening portions, and the second opening hardened portion is formed between the plurality of opening portions, so as to have a higher hardness than the remaining area of the electrical-steel-sheet formed body, by carrying out work hardening prior to forming the opening portion and the contoured shape of the rotor.

16. The method of manufacturing an electrical-steel-sheet formed body according to claim 12, wherein a plurality of opening portions are provided for each pole such that the permanent magnet is inserted into each of the plurality of opening portions, and the second opening hardened portion is formed between the plurality of openings, so as to have a higher hardness than the remaining area of the electrical-steel-sheet formed body, by carrying out work hardening on the area at an end portion of the opening portion after forming the opening portion.

17. The method of manufacturing an electrical-steel-sheet formed body according to claim 12, wherein the external action results from peening work or plastic deformation.

18. The method of manufacturing an electrical-steel-sheet formed body according to claim 12, wherein the electrical steel sheet is punched or blanked in a shape defined in consideration of a deformation amount of the electrical steel sheet with respect to the shape of the rotor and subsequently plastically deformed to obtain the shape of the rotor.

19. The method of manufacturing an electrical-steel-sheet formed body according to claim 18, wherein the electrical steel sheet is punched or blanked in the shape defined in consideration of a deformation amount of the electrical steel sheet with respect to the shape of the rotor and subsequently stacked in a plurality of sheets.

20. The method of manufacturing an electrical-steel-sheet formed body according to claim 18, wherein a deformation percentage of the electrical steel sheet is $\geq 0.05\%$ and $\leq 1.5\%$.

* * * * *